Figure 1:
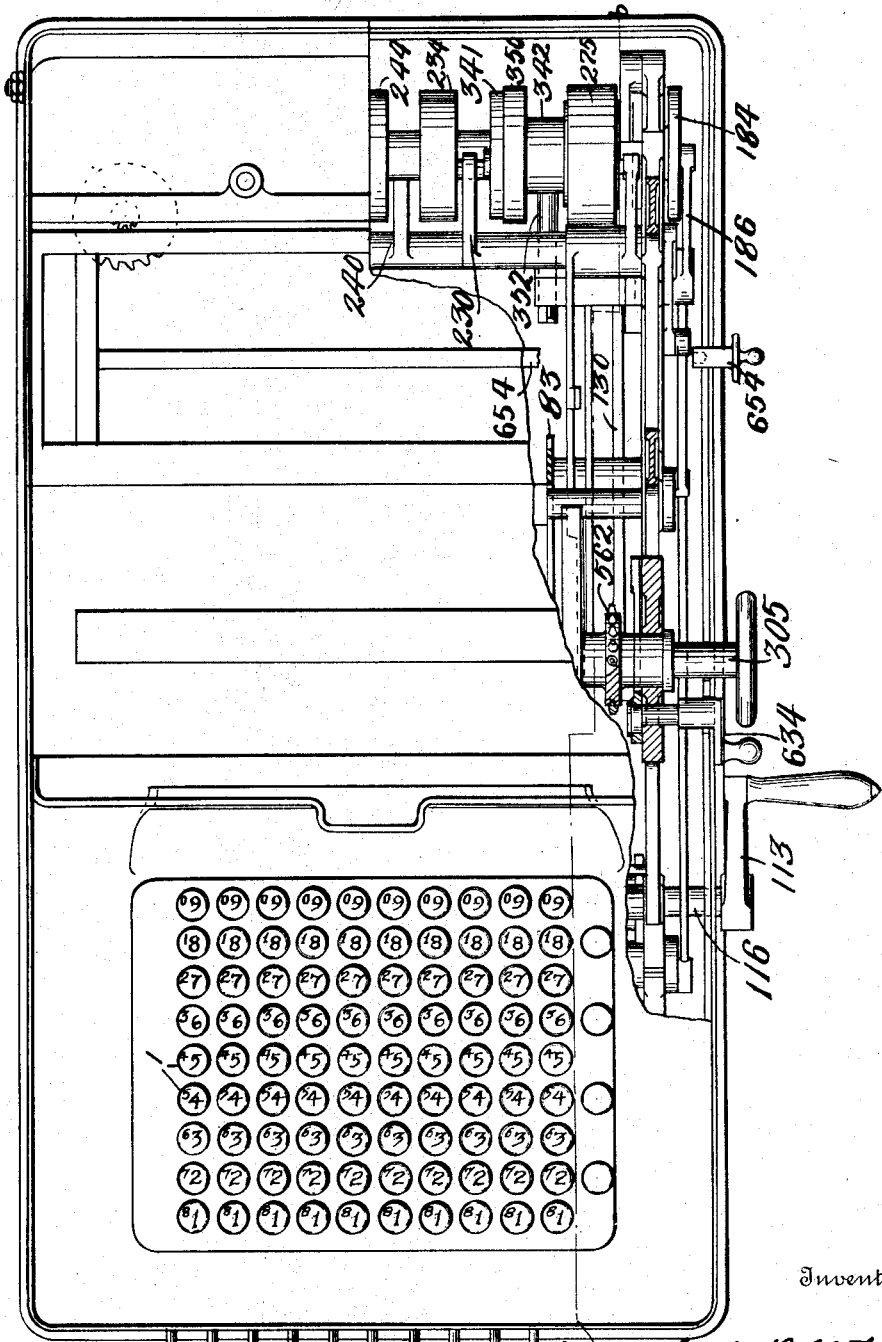

C. P. WETMORE.
COMPUTING MACHINE.
APPLICATION FILED JAN. 15, 1909.

1,204,524.

Patented Nov. 14, 1916.
18 SHEETS—SHEET 1.

Witnesses:
Inventor
Charles P. Wetmore
By
Erwin & Wheeler
Attorneys

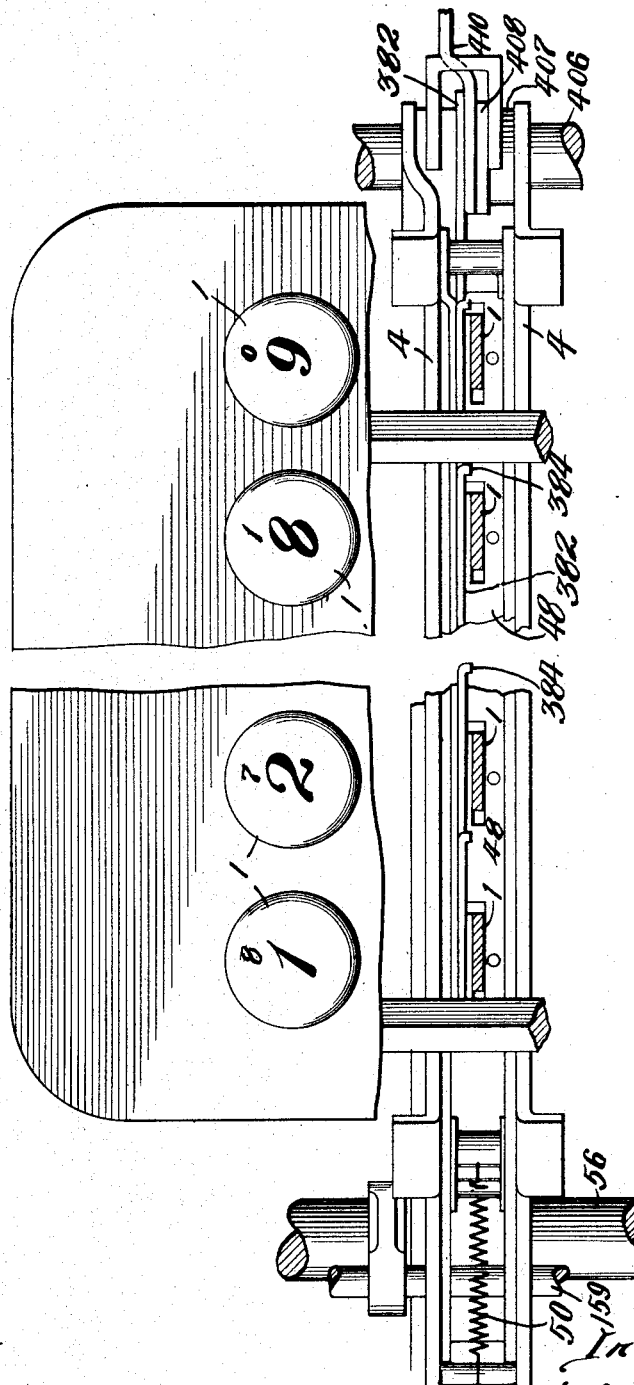

C. P. WETMORE.
COMPUTING MACHINE.
APPLICATION FILED JAN. 15, 1909.
1,204,524.
Patented Nov. 14, 1916.
18 SHEETS—SHEET 3.
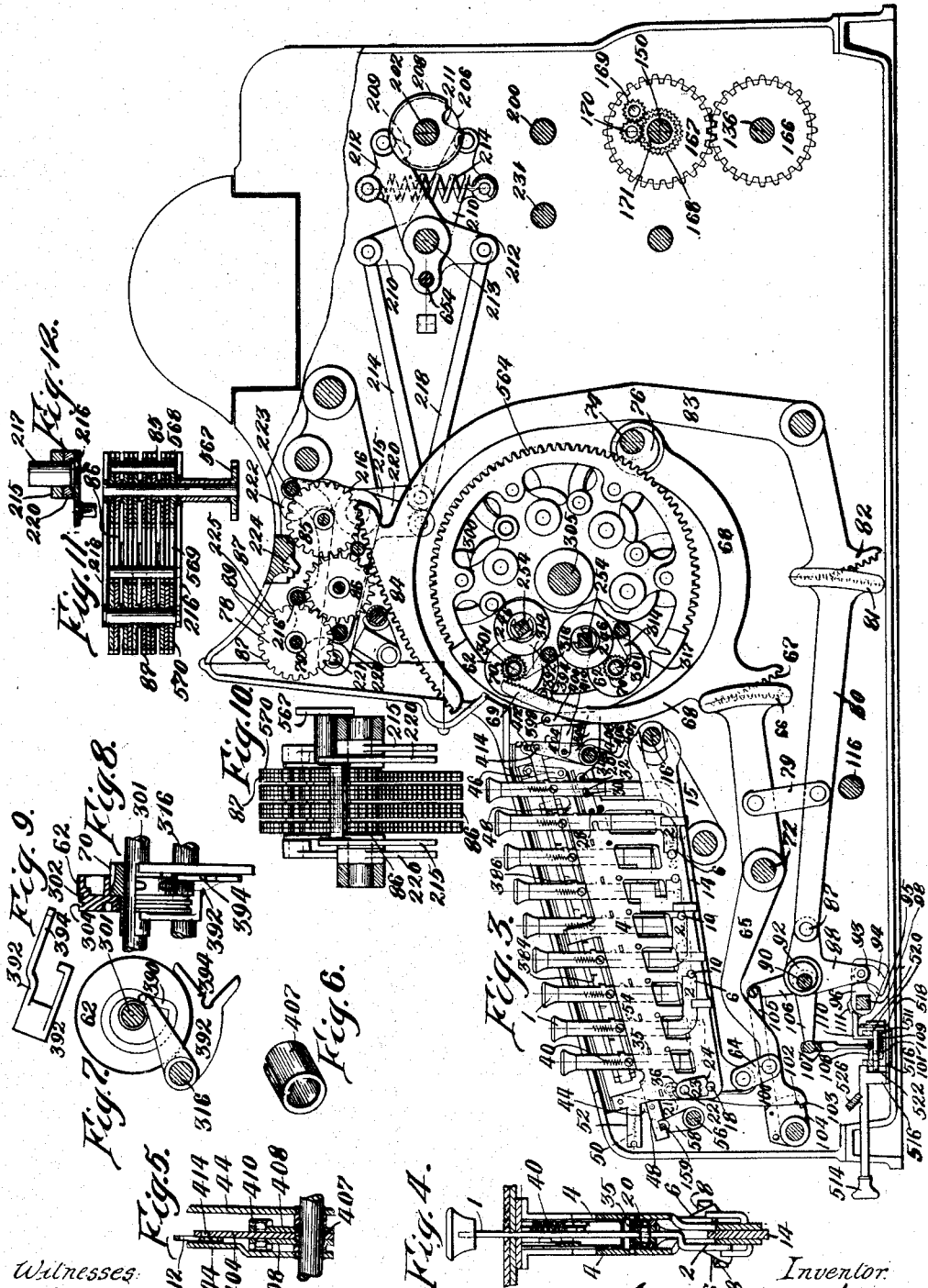

C. P. WETMORE.
COMPUTING MACHINE.
APPLICATION FILED JAN. 15, 1909.
1,204,524.
Patented Nov. 14, 1916.
18 SHEETS—SHEET 4.
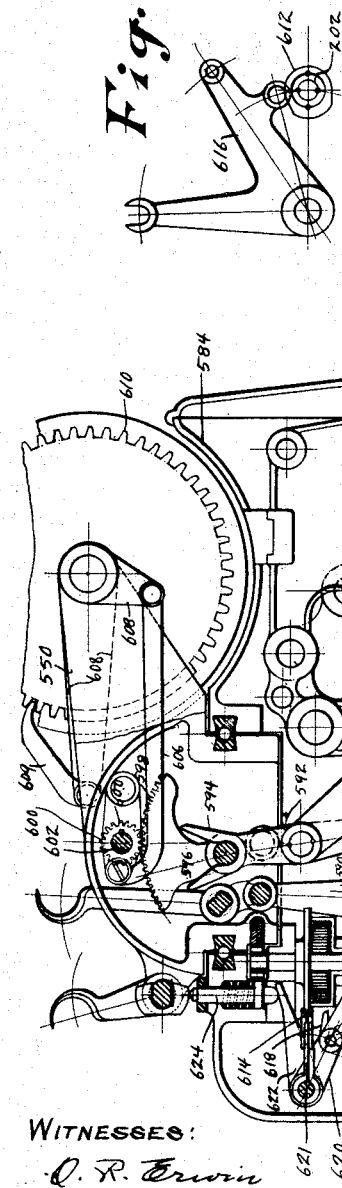
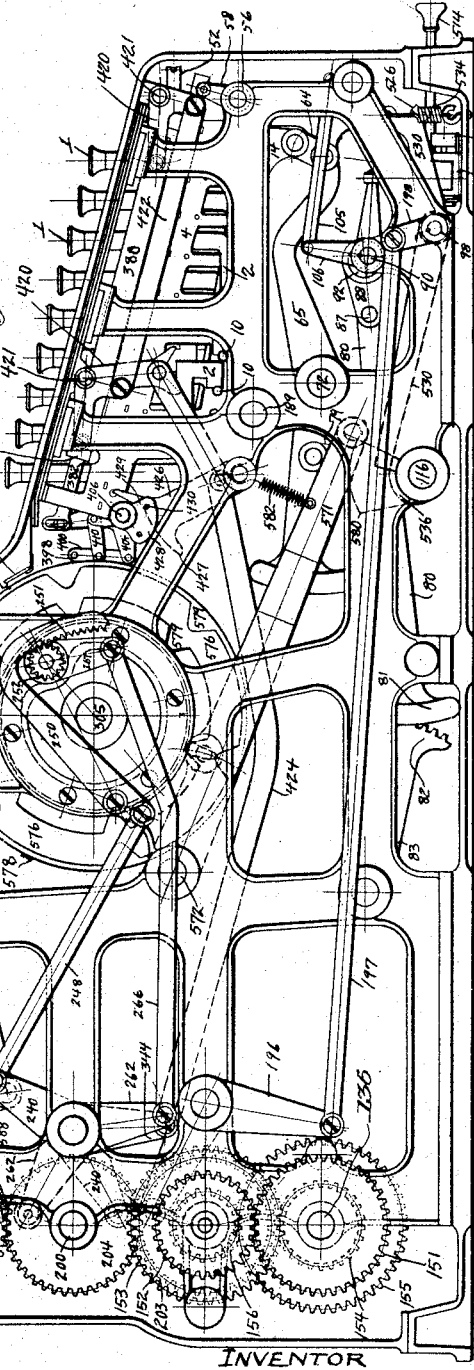
WITNESSES:
O. R. Erwin
J. D. Bremer
INVENTOR
Charles P. Wetmore
By Erwin & Wheeler
ATTORNEYS.

C. P. WETMORE.
COMPUTING MACHINE.
APPLICATION FILED JAN. 15, 1909.

1,204,524.

Patented Nov. 14, 1916.
18 SHEETS—SHEET 5.

WITNESSES:
O. R. Erwin
L. D. Bremer

INVENTOR
Charles P. Wetmore
By Erwin & Wheeler
ATTORNEYS.

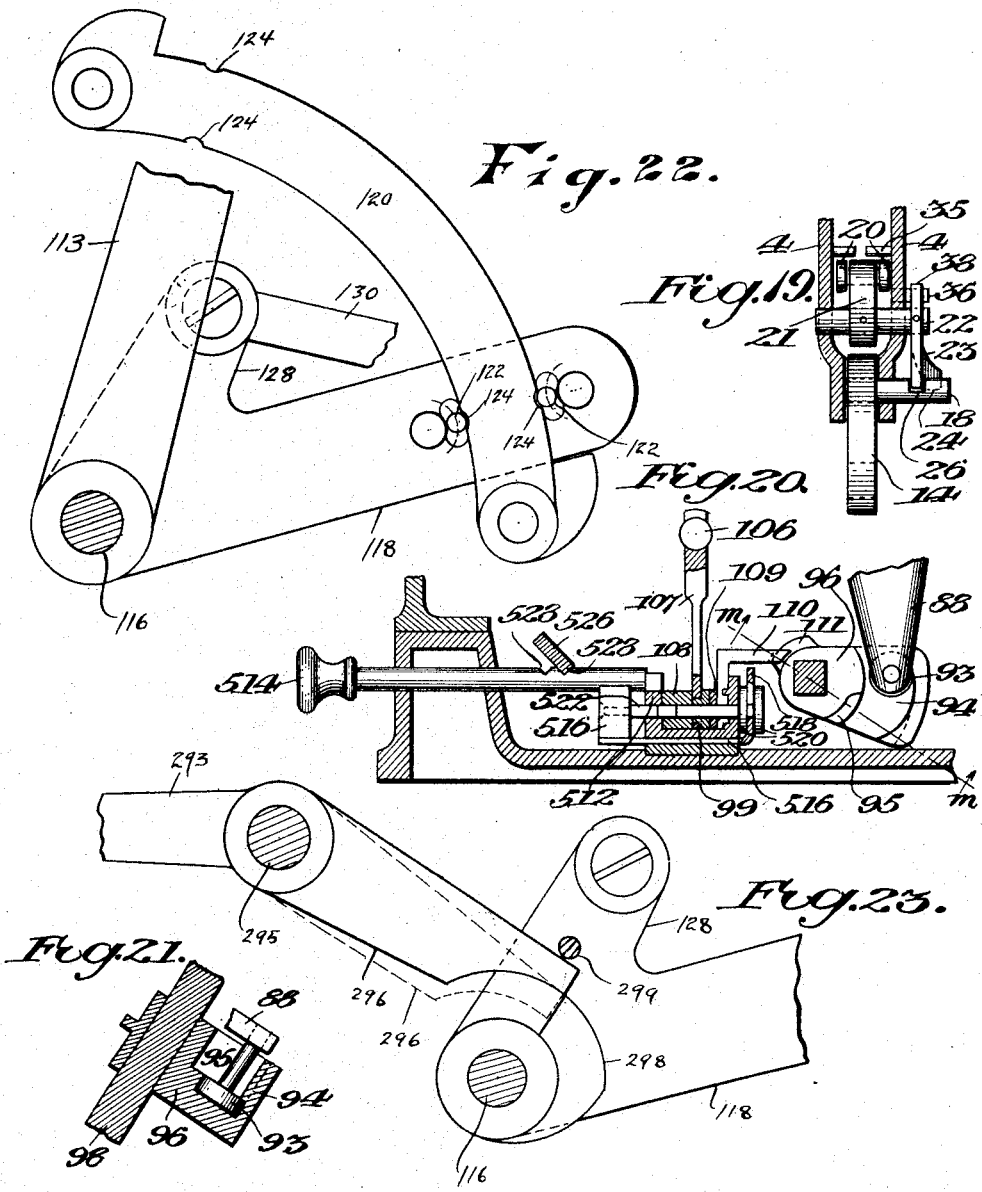
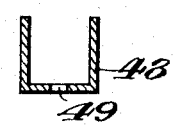

C. P. WETMORE.
COMPUTING MACHINE.
APPLICATION FILED JAN. 15, 1909.

1,204,524.

Patented Nov. 14, 1916.
18 SHEETS—SHEET 7.

Fig. 24.

Witnesses
Inventor
Charles P. Wetmore
By Erwin & Wheeler
Attorneys

C. P. WETMORE.
COMPUTING MACHINE.
APPLICATION FILED JAN. 15, 1909.
1,204,524.
Patented Nov. 14, 1916.
18 SHEETS—SHEET 9.
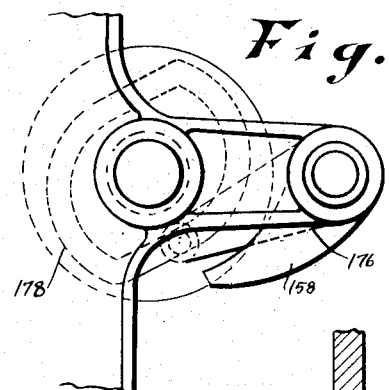
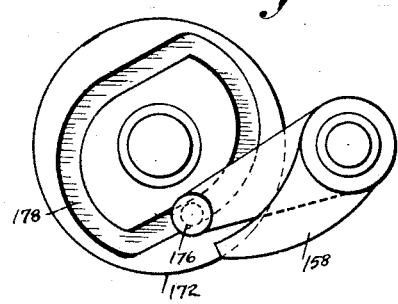
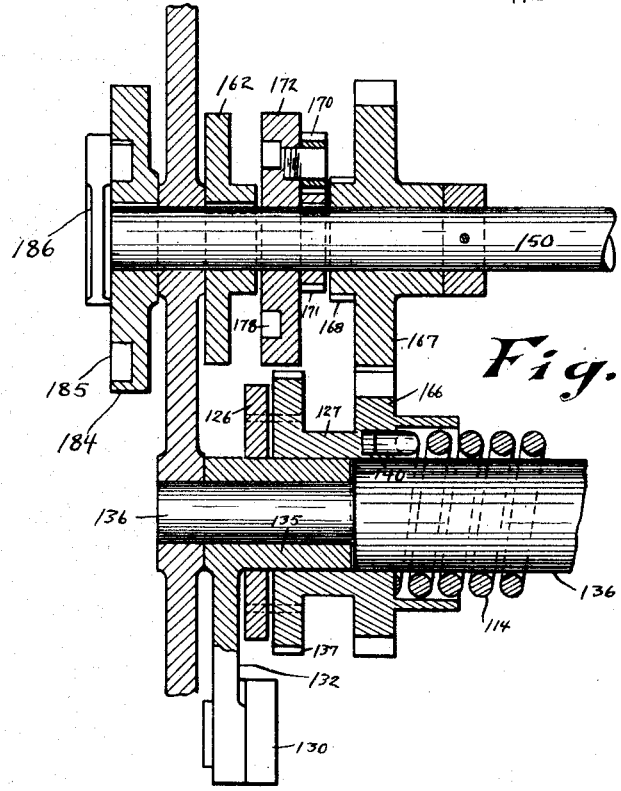
WITNESSES:
INVENTOR
Charles P. Wetmore
By Erwin & Wheeler
ATTORNEYS C. P. WETMORE.
COMPUTING MACHINE.
APPLICATION FILED JAN. 15, 1909.
1,204,524.
Patented Nov. 14, 1916.
18 SHEETS—SHEET 10.
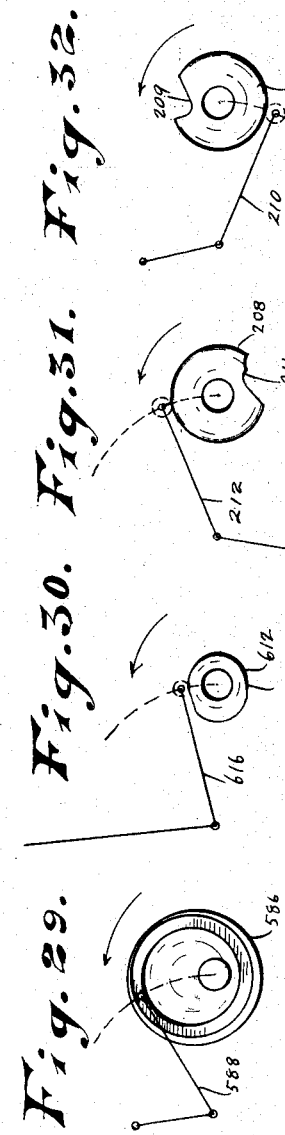
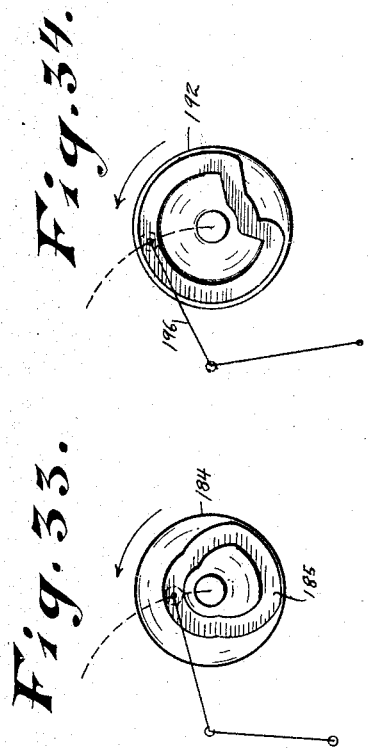
WITNESSES:
O. R. Erwin
L. D. Bremer
INVENTOR
Charles P. Wetmore
By Erwin & Wheeler
ATTORNEYS.

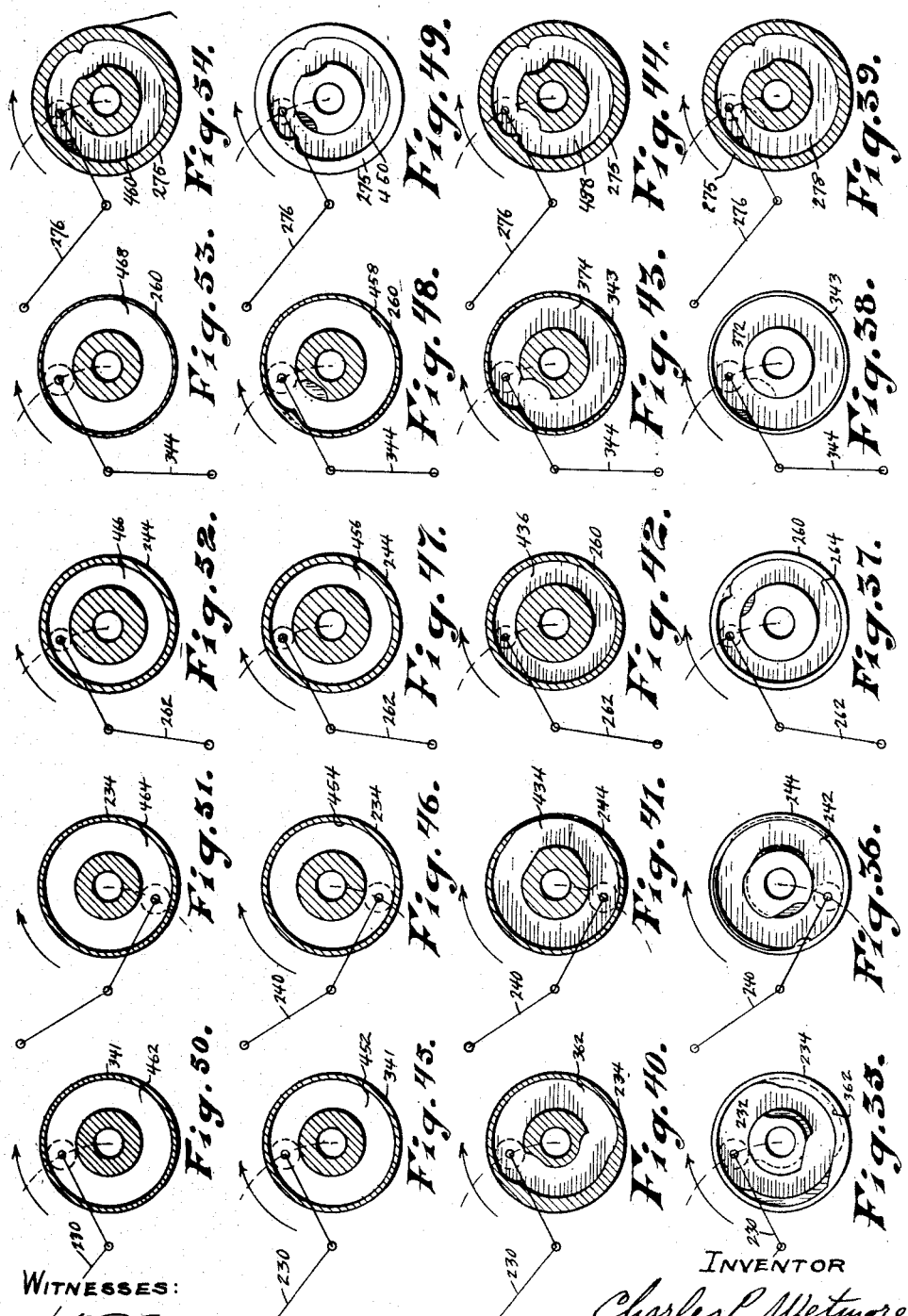

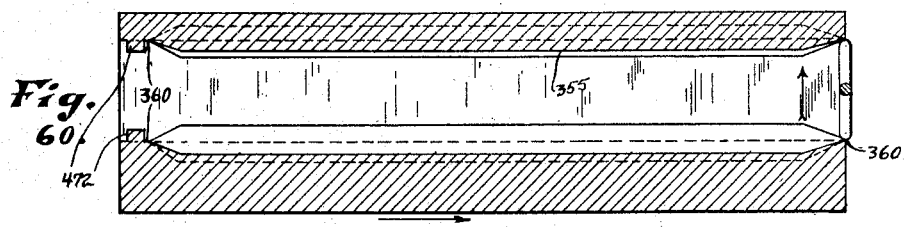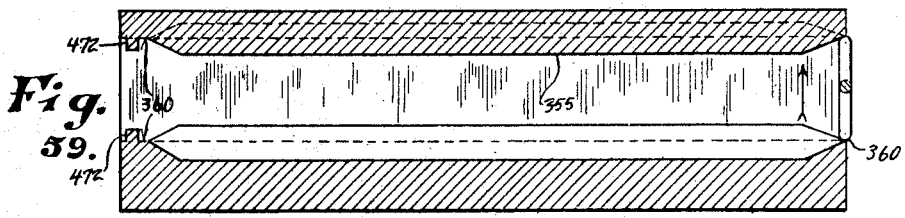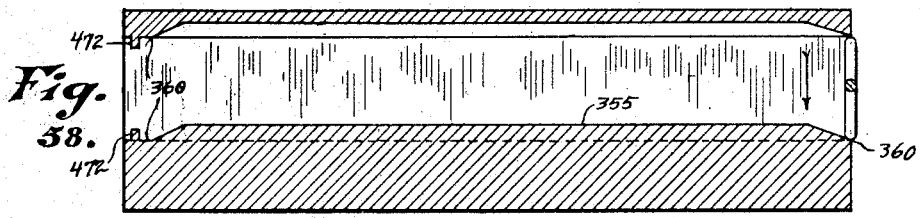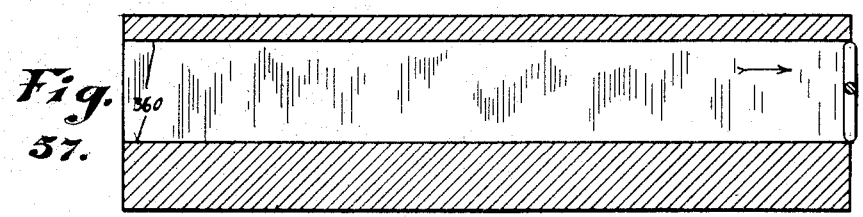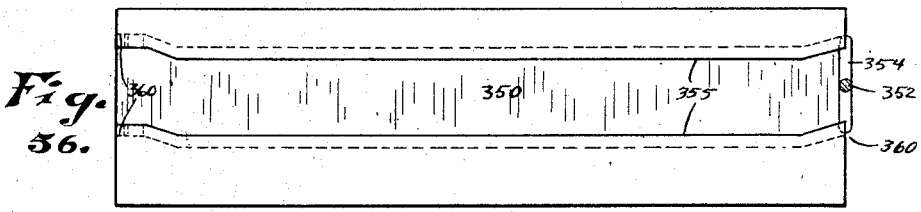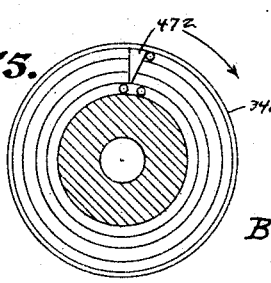

C. P. WETMORE.
COMPUTING MACHINE.
APPLICATION FILED JAN. 15, 1909.

1,204,524.

Patented Nov. 14, 1916.
18 SHEETS—SHEET 13.

WITNESSES:
O. R. Erwin
L. D. Bremer

INVENTOR
Charles P. Wetmore
By Erwin & Wheeler
ATTORNEYS

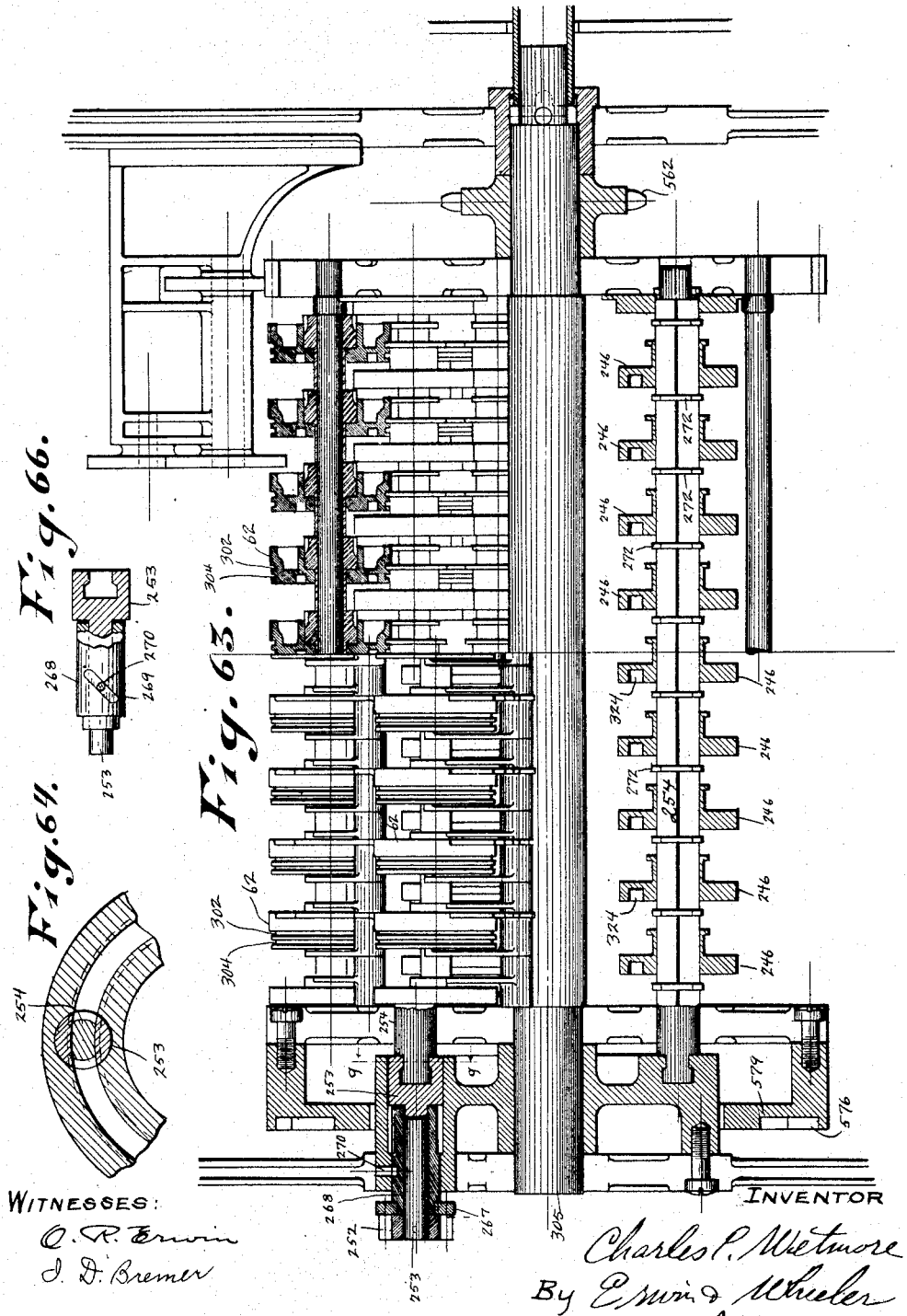

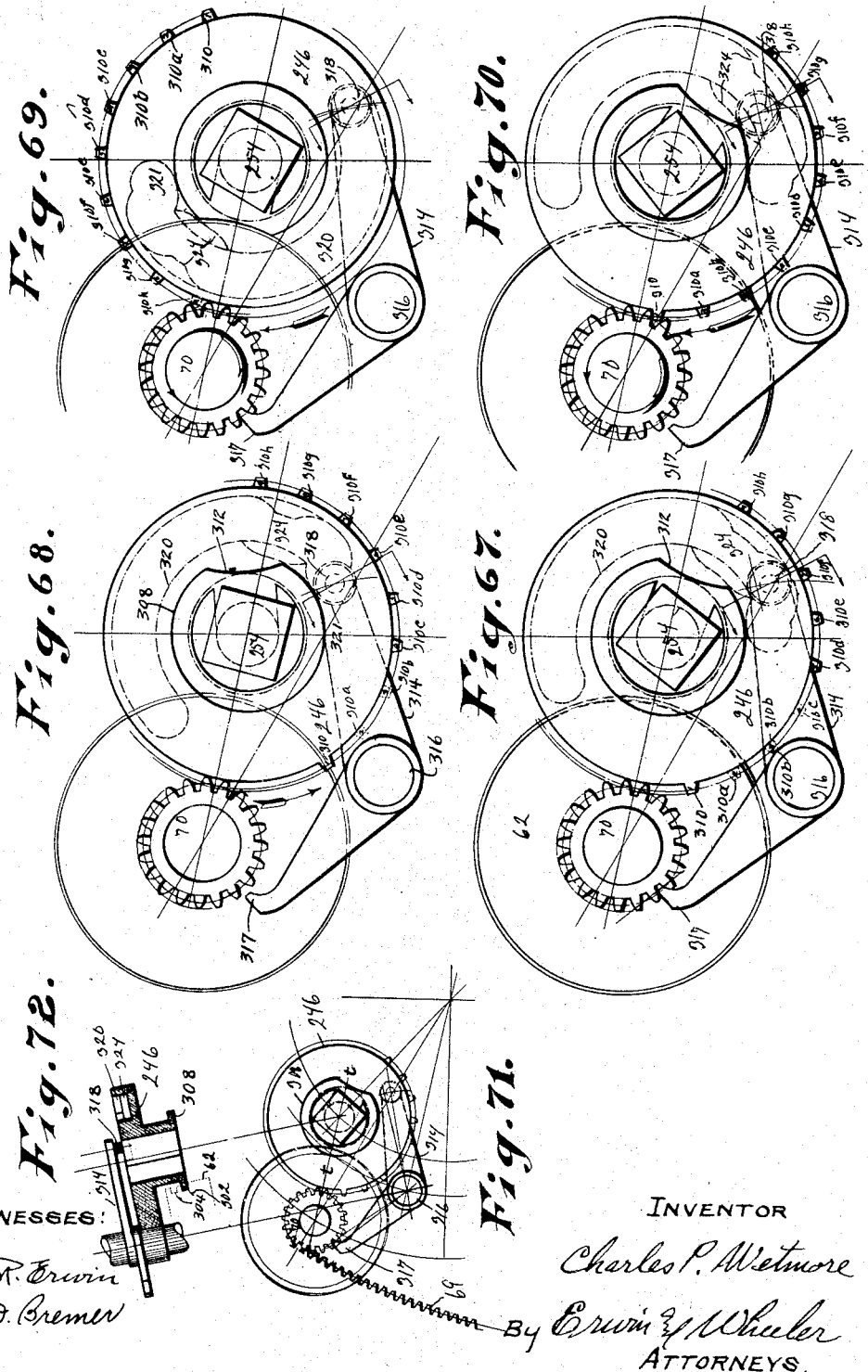

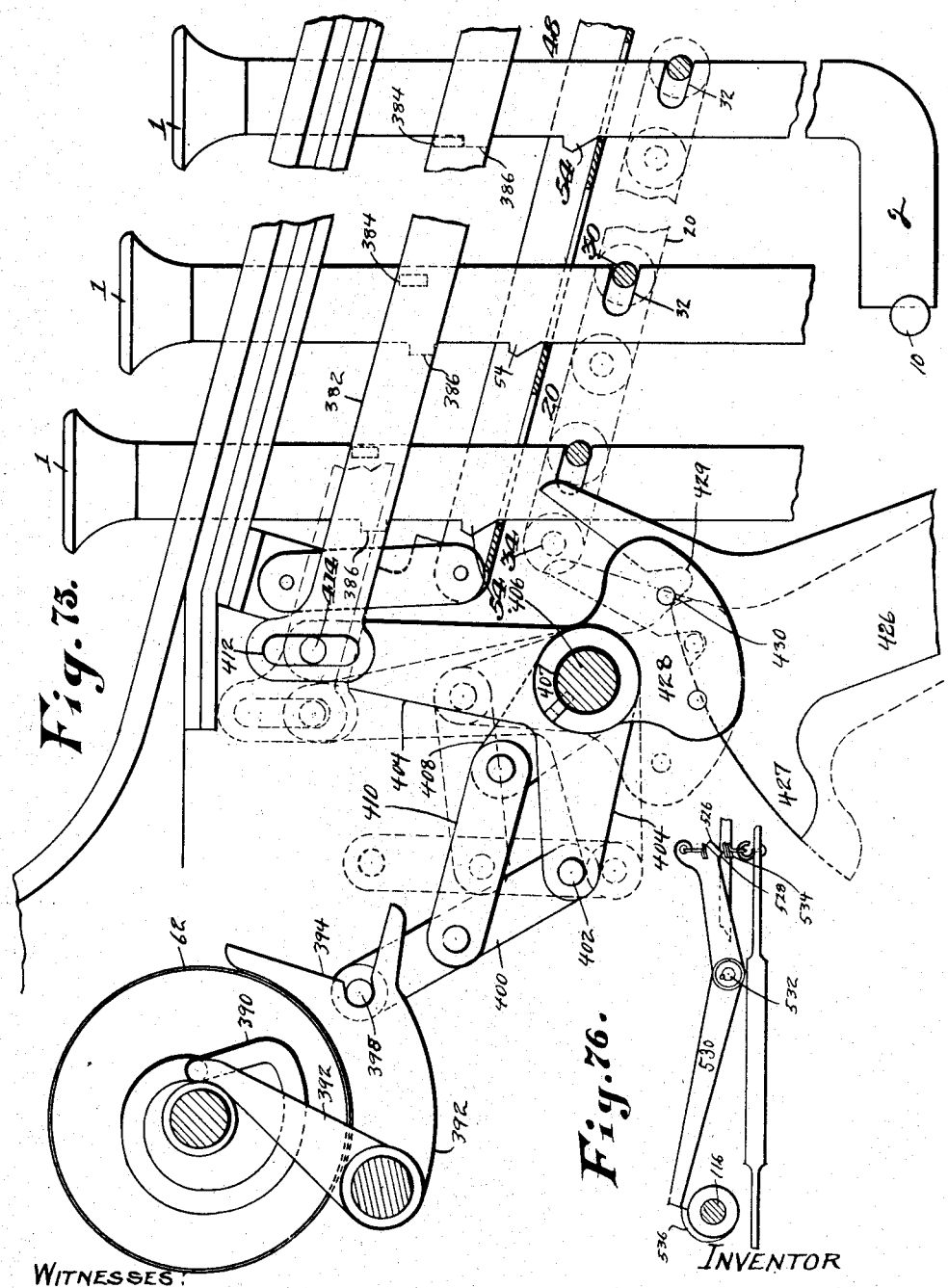

C. P. WETMORE.
COMPUTING MACHINE.
APPLICATION FILED JAN. 15, 1909.
1,204,524.
Patented Nov. 14, 1916.
18 SHEETS—SHEET 17.
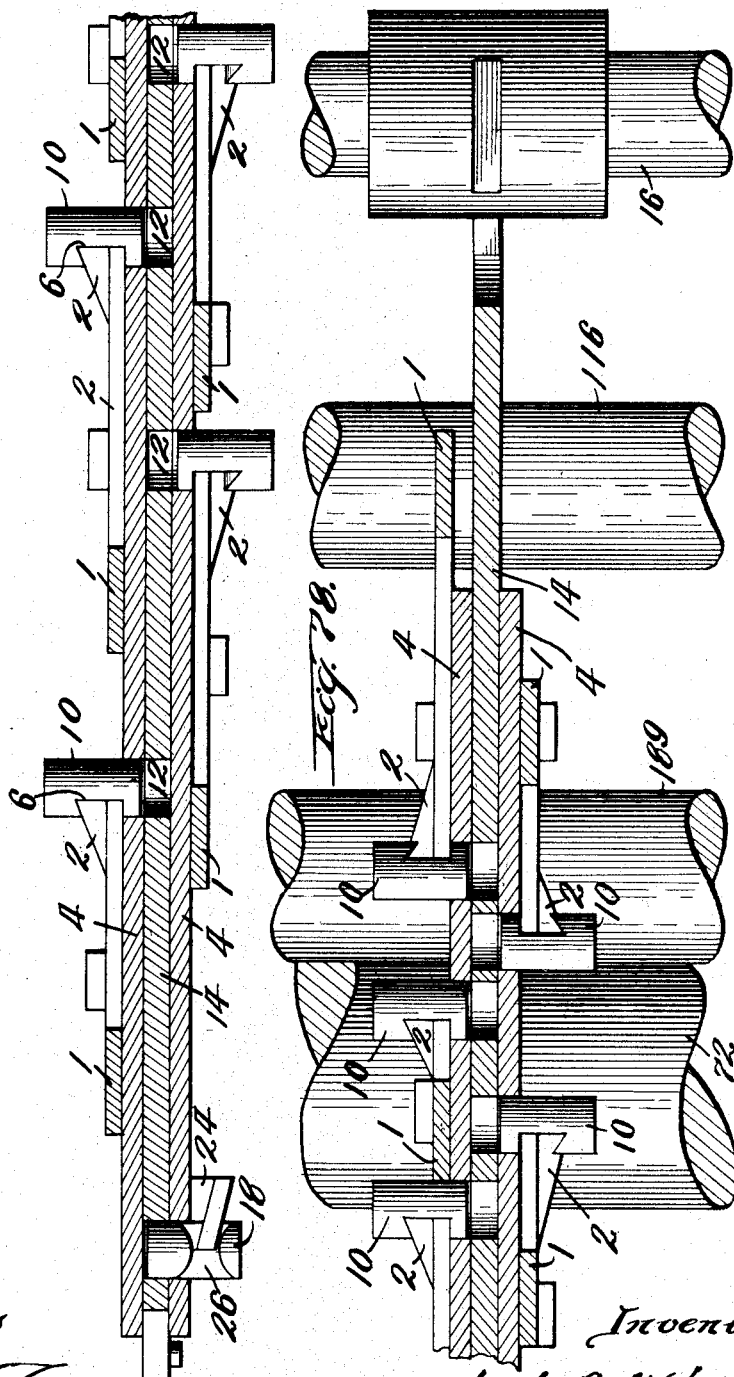
Witnesses
H. L. Farrington
J. D. Bremer
Inventor:
Charles P. Wetmore
by Erwin & Wheeler
Attys.

C. P. WETMORE.
COMPUTING MACHINE.
APPLICATION FILED JAN. 15, 1909.
1,204,524.
Patented Nov. 14, 1916.
18 SHEETS—SHEET 18.
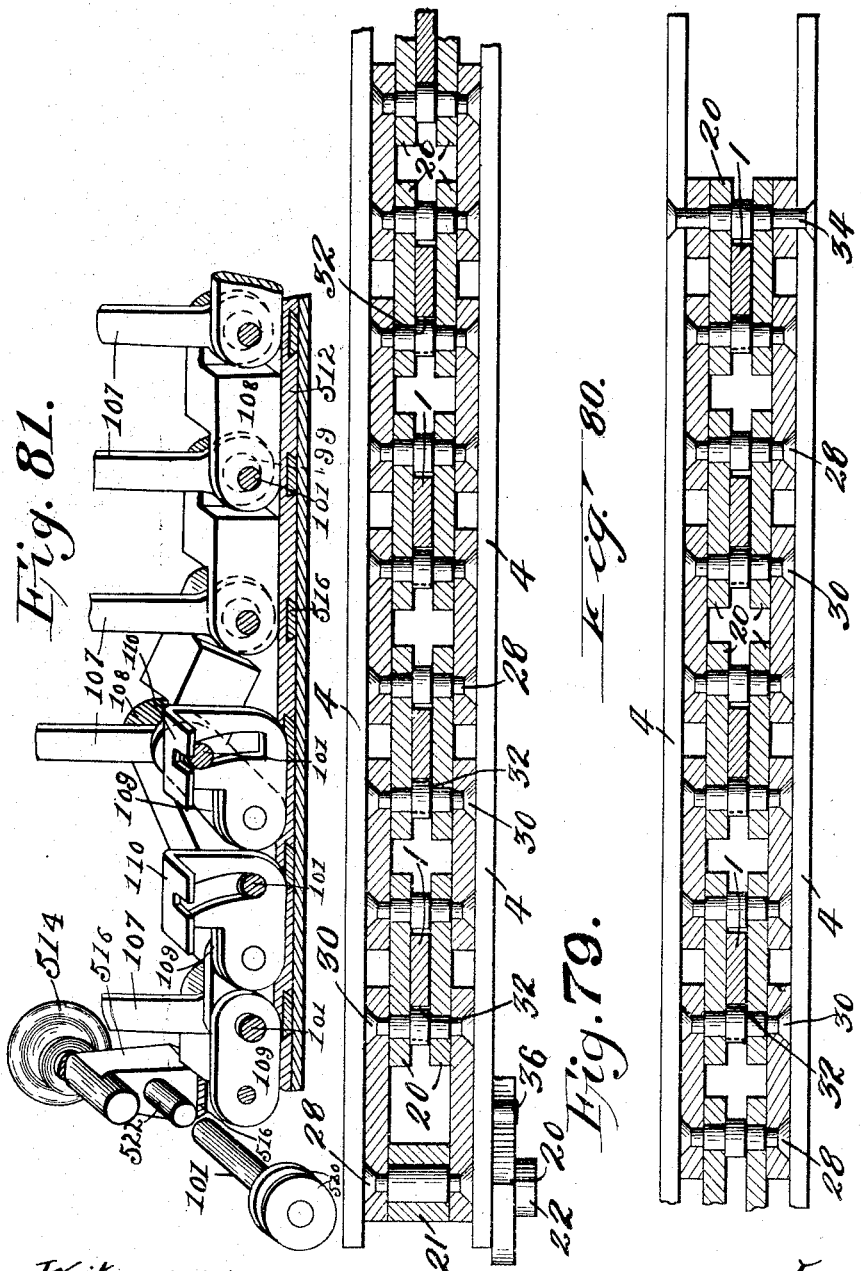

UNITED STATES PATENT OFFICE.

CHARLES P. WETMORE, OF MILWAUKEE, WISCONSIN, ASSIGNOR, BY MESNE ASSIGNMENTS, TO WETMORE ADDING MACHINE CO., OF MILWAUKEE, WISCONSIN, A CORPORATION OF WISCONSIN.

COMPUTING-MACHINE.

1,204,524.   Specification of Letters Patent.   Patented Nov. 14, 1916.

Application filed January 15, 1909. Serial No. 472,499.

*To all whom it may concern:*

Be it known that I, CHARLES P. WETMORE, a citizen of the United States, residing at Milwaukee, county of Milwaukee, and State of Wisconsin, have invented new and useful Improvements in Computing-Machines, of which the following is a specification.

My invention relates to improvements in computing machines.

The object of my invention is to provide means whereby all adjustments of the accumulating and printing wheels will be accomplished by direct transmission of motion from a main source of power supply, herein termed the motor and illustrated as a power storing spring thereby avoiding the use of any subordinate power storing devices and dispensing with all independent reactionary movements of the character produced by such devices and in the absence of breakage precluding the possibility of error in the operation of the machine.

The term "registering adjustments," as herein employed, refers to all the mechanical movements, except the setting movements of the manually actuated keys, the power storing movements of the main actuating lever and its connections, and the printing movements of the printing wheels or members after they have been adjusted in accordance with the value represented by the set keys.

My invention also has for its object the avoidance of retractive springs or other independently acting devices for operating the connections directly acted upon by the value setting keys, the keys alone being independently retracted to normal position by means of separate springs.

In the following description, reference is had to the accompanying drawings, in which—

Figures 15, 16, 17:
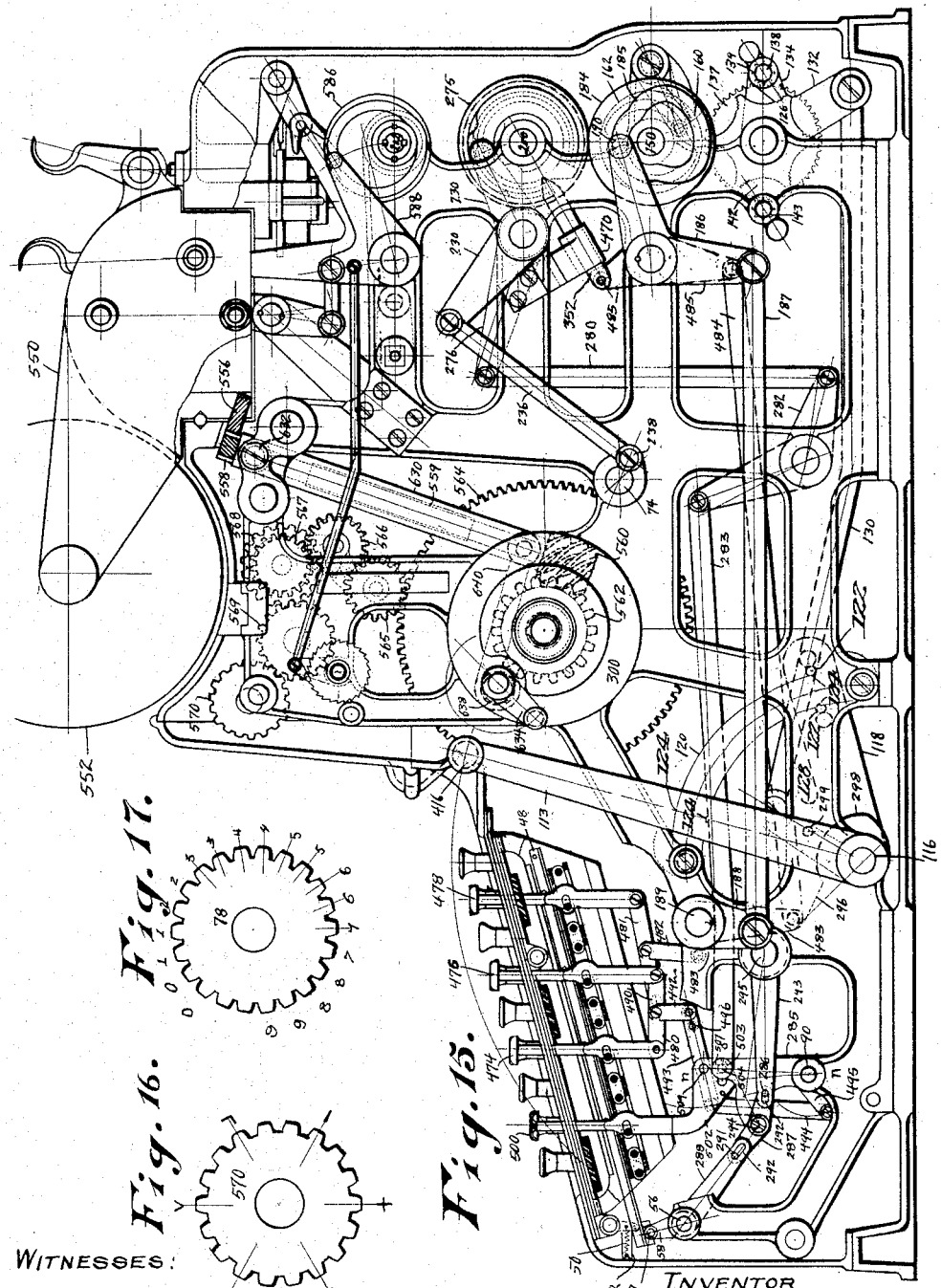
Figure 25:
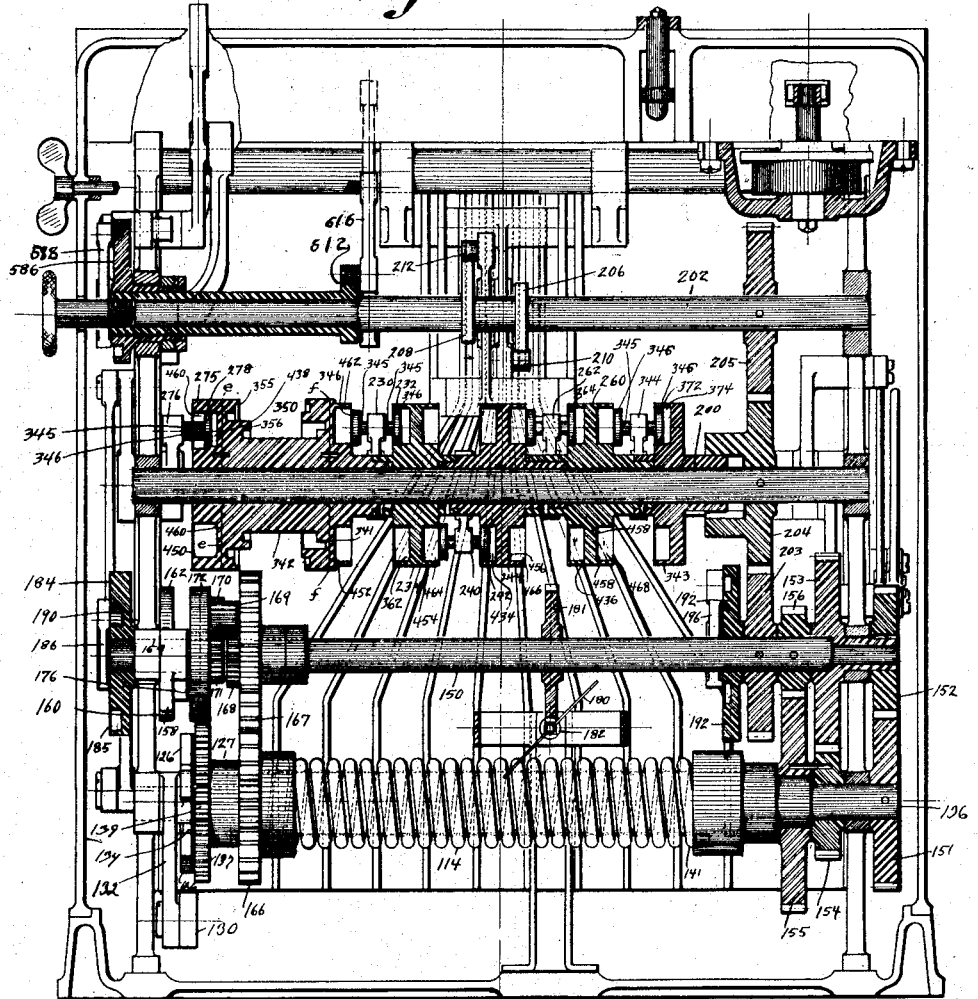
Figure 61:
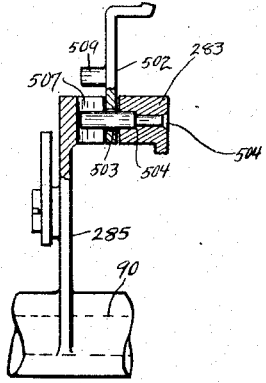
Figure 62:
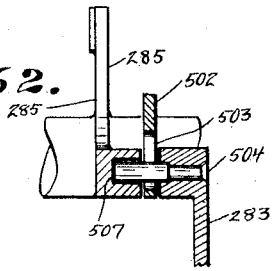
Figure 74:
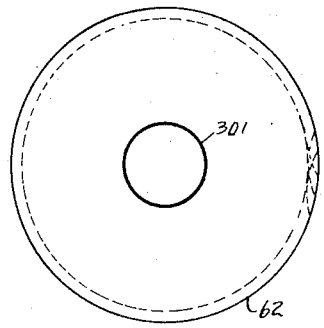
Figure 73:
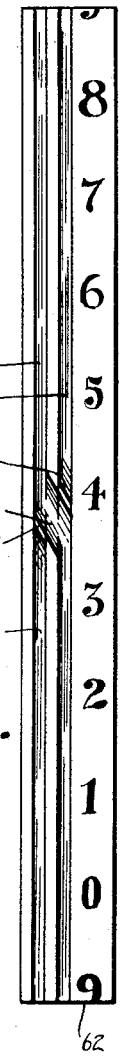
Figure 65:
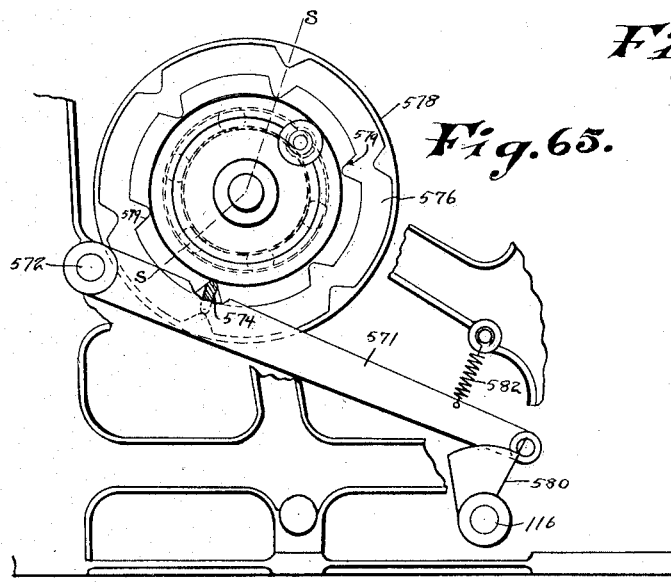

Figure 1 is a plan view of my invention with a portion of the upper wall of the casing partially broken away. Fig. 2 is a detail plan view of part of the key board portion of the machine, the key board being partially broken away and showing some of the keys in cross section, together with other portions of the mechanism located directly under the key board. Fig. 3 is a sectional view drawn on line *b—b* of Fig. 1. Fig. 4 is a detail vertical sectional view drawn transversely through one of the key frames and showing the relation of the keys to the main differential lever. Fig. 5 is a sectional view drawn on line *c—c* of Fig. 3. Fig. 6 is a detail perspective view of the feathered sleeve shown in Fig. 5. Fig. 7 is a detail side view of the accumulator showing its eccentric groove and a jack controlling fork. Fig. 8 is a detail front view, part in section, of the same. Fig. 9 is a detail view of the jack controlling fork, as seen from the upper side. Fig. 10 is an elevation of the type wheel cage. Fig. 11 is a sectional view of the type wheels and their actuating connections drawn on line *d—d* of Fig. 3. Fig. 12 is a detail sectional view on line *h—h* of Fig. 3 showing one of the trunnions of the type wheel cage. Fig. 13 is an elevation of the left hand side of the machine, viz. the side opposite that from which Fig. 3 is viewed, the casing side wall being removed. Fig. 14 is a detail view of the tabulator cam and bell crank lever. Fig. 15 is a right hand side elevation with the casing side wall removed. Fig. 16 is a detail side view of the symbol wheel surrounded by detail end views of the symbol carrying cogs. Fig. 17 is a side view of one of the type wheels surrounded by detail end views of the type cogs. Fig. 18 is a detail cross sectional view of one of the key latches. Fig. 19 is a detail view of the lower end of one of the levers 14, its normal fulcrum pin 22, and the means for withdrawing such pin, a portion of the frame cage being shown in cross section. Fig. 20 is an enlarged detail cross sectional view of the parts shown at the lower left hand corner of Fig. 3. Fig. 21 is a detail sectional view drawn on line *m—m* of Fig. 20. Fig. 22 is a detail view of the main actuating lever and clutch arm in its relation to the locking segments. Fig. 23 is a detail view of shaft 116 and the locking cams. Fig. 24 is a front elevation with the casing wall partially removed and with parts broken away, as indicated. Fig. 25 is a rear elevation, part in section, on the axes of the cam supporting shafts, the casing wall being removed. Fig. 26 is a detail side view of the locking pawl 158 in its relation to the shaft disk. Fig. 27 is a detail side view of the cam for locking and unlocking the pawl. Fig. 28 is a detail view in vertical section through the end portions of shafts 150 and 136. Figs. 29, 30, 31, and 32 are side views of the cams upon the shaft 202, shown in Fig. 25, illustrating respectively the cam for actuating the platen and ribbon feed mechanisms, the cam for actuating the tabulating mechanism, the cam for actuating the type wheel cage for the printing stroke, and the cam for locking the type wheels during the printing stroke. Figs. 33 and 34 are similar views of the main actuator cam and auxiliary actuator cam, located on the shaft 150, shown in Fig. 25. Figs. 35 to 54 inclusive, are side and vertical sectional views drawn transversely through the shaft 200 showing the various grooves of the shifting cams on said shaft which control the variable motion elbow cranks, the several views being drawn to planes completely exposing the respective grooves, with Figs. 35 to 39 inclusive showing the grooves in operation during normal key printing; Figs. 40 to 44 showing the grooves in operation when printing totals; Figs. 45 to 49 showing the grooves in operation when printing sub-totals; and Figs. 50 to 54 showing the grooves in operation when printing without adding. All the illustrations on this sheet are viewed from the right hand side of the machine (i. e. from the left hand side of Fig. 25). Fig. 55 is a central vertical sectional view of the master cam viewed from the same direction as Figs. 35 to 54. Fig. 56 is a development of the peripheral surface of the central portion of this cam between line e—e f—f of Fig. 25. Figs. 57, 58, 59, and 60 are developments, drawn to cylindrical sections of the central portion of said cam coincident with the eccentric key ways in operation, when printing totals, when printing subtotals, and when printing without adding, respectively, the master key being shown at starting point in each view. Fig. 61 is a detail sectional view drawn on line n—n of Fig. 15. Fig. 62 is a detail sectional view drawn on line o—o of Fig. 15. Fig. 63 is a front elevation of the counting wheel cage and counters, part in section on a plane through the axis of the central supporting shaft, and on line s—s of Fig. 65. Fig. 64 is a detail sectional view drawn on line g—g of Fig. 63. Fig. 65 is a detail side view of the locking wheel for the counter-carrying cage. Fig. 66 is a detail view of sleeve 268 and coupling 253. Figs. 67, 68, 69 and 70 are detail side views, illustrating the various positions of the transferring wheels and their relation to the counting wheel pinions as well as the relation of their single teeth to each other. Fig. 71 is a detail side view, illustrating the relation of the same parts to the actuating racks. Fig. 72 is a sectional view drawn on line t—t of Fig. 71, with dotted lines indicating the position of the accumulator wheel. Fig. 73 is a view of the periphery of one of the accumulator cam members, developed showing the groove for shifting the transferring wheels. Fig. 74 is a detail view of one of the transferring wheels and accumulator wheels as seen from the side opposite that shown in Figs. 67 to 70. Fig. 75 is a detail side view of one set of jack actuating connections and a corresponding accumulator wheel. Fig. 76 is a detail side view of the latch mechanism for the specializing keys showing the means for locking the machine while a specializing key is being operated. Figs. 77 and 78 are detail sectional views, drawn longitudinally through the central portion of one of the chains 20 on a plane parallel to its upper surface and showing the front and rear portions thereof respectively. Figs. 79 and 80 are detail views of the front and rear portions respectively of one of the differential levers, the rear portion of such lever being shown extending above some of the transverse shafts in the lower portion of the machine. Fig. 81 is a detail view of a portion of the chain 108 and parts connected therewith.

Like parts are identified by the same reference characters throughout the several views.

The organization of the machine as a whole, involves the following general divisions:

I. The means for setting numerical values, manually controlled through keys.

II. The means for automatically regulating the transmission of motion in proportion to the set values, controlled primarily through a main differential lever.

III. The means for imparting transmission movements derived from the main actuating lever and exerted indirectly through a power spring and a series of cams actuated thereby.

IV. The means for dividing the power stored in the main or power spring, comprising the automatic development and transmission of all accumulating and registering movements from a series of cams driven by said spring.

V. The means for transferring or carrying values from an accumulating wheel to the wheel of next higher value.

VI. The means for carrying the cam actuated operations in accordance with the duty to be performed, the different operations being controlled by special keys acting through a master key.

VII. The means for subdividing the work comprising specializing mechanism controlled through setting keys or push buttons, whereby certain portions of the apparatus may be rendered operative or inoperative at will.

VIII. The means for shifting the platen carriage and bringing another set of counting accumulators into operation, whereby sets of items of different character may be recorded in order and the totals for the various items of all the sets subsequently ascertained and recorded.

For the sake of clearness, the above mentioned divisions will be consistently followed, and in the same order, in the descriptive part of the specification.

I. (Figs. 1, 2, 3, 4, 5, 24, 75, 18 and 19.) The value setting keys 1 are arranged in the usual order upon the keyboard, the same being in rows with the row at the right representing the units column, the next the tens column, etc. All the keys are of the same length and have the same length of stroke and operating pressure. Each key is provided with a foot piece 2 and these foot pieces are offset laterally, those of the alternate keys being offset in one direction and those of the intermediate keys in the opposite direction to prevent interference, the upper portions of the keys being arranged in a straight line. Each row of keys and the mechanism directly connected with them are mounted in a frame cage 4, Figs. 3 and 4 and the free end of each foot piece is provided with an angular margin 6, which loosely engages in a channel 8 formed in one side of a selector pin 10. The pins are mounted to slide laterally in suitable bearings in the cage and as the margin 6 of each key extends downwardly and outwardly toward the outer end of the pin, with its lower portion engaging in the channel 8 thereof, such pin is forced inwardly by the downwardly moving angular margin of said key as it moves along the side of the pin in said channel when the key is depressed and the pin then enters an aperture 12 in a main differential lever 14. The inserted pin is then adapted to serve as a fulcrum bearing for said lever as hereinafter explained. One such lever is employed for each row of keys.

In the construction shown, the keys representing odd numbers are arranged, when depressed, to drive pins from left to right into the apertures of the lever 14, and those representing even numbers are arranged to drive the pins with which they connect from right to left into the corresponding lever apertures. For economy of space, the foot pieces of the lower keys in the row (Fig. 3) preferably extend rearwardly or toward the center of the machine and progressively decrease in length. The keys at the upper end of the row have foot pieces which extend forwardly so that the pins are brought nearer together in the row than is practicable for the keys themselves, and the end pins are thus brought nearer the center of the lever 14 than the end keys. This also shortens the variations of the stroke in the working end of the levers, such as are due to the substitution of different selector pins as fulcrums.

In each row, the corresponding differential lever 14 is supported at one end by a crank 15 and crank pin 16. The other end of the lever is normally supported by a supporting pin 18 in a position to receive any one of the selector pins in the row. When one of the keys is depressed to insert a selector pin, it actuates a chain 20, (Fig. 3) the motion of which is transmitted through a bell crank composed of arm 21, fulcrum pin 22, and arm 23 (Fig. 19) to withdraw the pin 18, the arm 23, having an angular margin 24 moving in a channel 26 in one side of pin 18, and actuating the latter in substantially the same manner as the selector pins are actuated, except that the depression of any key withdraws the supporting pin 18 at the same time that it inserts a selector pin.

The chain 20 is composed of a series of links loosely supported from the cage at alternate joints by cross pins 28 and having the pintles 30 of the intermediate joints, (Fig. 79) each loosely engaged in a notch 32 in one of the keys, whereby the depression of the key depresses two of the links and causes them to assume an angular position in the space between two cross pins. The upper end of the chain is secured to the cage by a fixed upper anchorage pin 34, and when any two links are depressed by a key, the connecting arm 21 of the bell crank is necessarily actuated. A stop 36 in the path of a shoulder 38 on the bell crank so limits the motion of said crank, that but one key can be depressed at a time. A skeleton frame member 35 (Fig. 3) above the chain prevents it from lifting.

Each of the keys is provided with a retractile spring 40, which tends to lift it to normal position. When a key is depressed, however, it is locked against the tension of the spring 40 by a swinging latch bar 48 common to all the keys in the row and supported at its respective ends by links 44 and 46. This bar is preferably U-shaped in cross section and the keys pass through slots 49 in the bar (Fig. 18). The bar is pulled forwardly by a spring 50, connecting link 44 with an arm 52 of the frame cage 4, (Fig. 3) whereby the latch bar is drawn against the respective keys at the rear ends of the slots. When a key is depressed, the angular lower face of a key projection 54, (Figs. 3 and 75) pushes the latch bar rearwardly until the projection passes below the bar, whereupon the spring 50 pulls the latch bar to normal position above projection 54 and holds the key in its depressed position. To permit the correction of errors in pressing a key, the chain 20 is made long enough to allow a partial depression of a second key sufficient to retract the latch bar and release the first key, which at once returns to normal position under the tension of its spring 40 and then allows a complete depression of the second key.

The key projections 54 are provided with angular lower margins, which operate to push the latch bars rearwardly during the initial downward movement of the key. After the latch bar is retracted, the key must still be moved downwardly to an additional extent in order to insert a selector pin 10 in position to serve as a fulcrum for the differential lever 14. The outer margin of the key projection 54 extends vertically for a sufficient distance to hold the latch bar in a retracted position until the pin has been fully inserted, whereupon the latch bar returns to its holding position and engages above the key projection. It is therefore obvious that the depression of a second key in the same row will operate first to push the latch bar to releasing position and as soon as this is done, the key first depressed, will be lifted by its retractile spring 40. It is also obvious that if the chain 20 is only a little longer than is required to permit the depression of a single key to a sufficient extent to insert one of the pins 10 and permit the latch bar to engage above the key projection 54, it will then not be possible to depress two keys unless the chain is long enough to permit a flexion at two points to a sufficient extent to not only retract the latch bars, but to insert the pins and permit the necessary latch bar reaction.

A cross shaft 56, common to all the rows of keys, is provided with raised arms 58 having studs 59 loosely engaging in notches 60 in the latch bars 48. This shaft is automatically actuated and releases all the keys after a registering operation as hereinafter explained. It will be observed in this connection, however, that the notches 60 are of such size that a slight oscillatory movement produced by the depression of a key is not sufficient to rock the shaft to a point where it will release keys in other rows.

II. (Figs. 1, 2, 3, 21, and 22.) The main differential lever 14 having been fulcrumed upon one of the selector pins by the depression of a key and the supporting end pin 18 having been withdrawn, an actuating or upward movement of the crank 15 rocks the lever upon such fulcrum. The pin 16 has a sliding bearing in the end of the lever to permit this movement. The downward movement of the other end of the lever is transmitted to an accumulating wheel 62 through the link 64, (Fig. 3) lever 65, interacting segments 66 and 67, curved rack bar 68 and rack teeth 69, the latter being adapted to mesh with a pinion 70 on the counting or accumulating wheel 62. The lever 65 is fulcrumed to a cross shaft 72 which is used in common for all such levers, there being one lever for each row of keys, or for each lever 14. The rack bars 68 are supported from a cross shaft 74 by eccentrics 76, which are actuated by means hereinafter explained, to rock the rack bars 68 upon the teeth of segment 66 and swing the rack teeth 69 out of engagement with the pinion during the up stroke whereupon the eccentrics are again actuated to swing the racks into engagement with the counting wheel pinions, preparatory to the commencement of the down stroke, the accumulator wheels being thus actuated only on the down stroke.

The motion of lever 65 above described, is communicated to a type wheel 78 through the links 79, lever 80, interacting gear segments 81 and 82, lever 83, toothed segment 84, and gear wheels 85 and 86, the latter being arranged to mesh with the type projections 87, which also serve as gear teeth.

Each alternate type or printing projection on each type wheel 78 has the same value as the preceding one, but is in italics or otherwise differentiated, (Fig. 17), so that it can be used for printing totals and subtotals. The ordinary operation of the machine therefore, requires that the type wheel move a distance represented by two of its teeth or type projections, and this is accomplished in the proportionate length of the arms of the above described levers, or in the gearing. But it is also desirable to provide the registering wheels with two short, or blank teeth 89, preceding those carrying the cipher characters in order to provide for automatically printing ciphers at the right and none at the left of the digits registered, as hereinafter explained. For this reason, each registering wheel must initially move from normal position a distance represented by four of its teeth, in order to bring the type numeral 1 into position for printing, and as the above described lever movement is only equal to that represented by two registering wheel teeth for one space on the counting wheel, an additional initial movement equal to the distance represented by the two blanks must be secured. To provide for this, the levers 80 are each fulcrumed at 87 to one arm of a bell crank modifier 88, which is supported from a cross shaft 90 common to similar modifiers, one for each row of keys. These modifiers are supported from the shaft 90 by eccentrics 92, which are fast on the shaft and stationary for all normal or key printing movements. The depending arms of these modifiers are provided with lateral projections 93, which are engaged selectively in channel 94 or channel 95, (Figs. 3, 20, and 21), of a shifting member 96, supported by an oscillatory square shaft 98, which is actuated as hereinafter explained, to raise the members 96, (one for each row of keys), preparatory to each printing operation. The channel 94 is in the arc of a circle concentric with the axis of the shaft 98, and when the projection 93 is engaged in this channel, (its normal position), the elevation of the member 96 has no effect upon the bell crank modifier. But whenever a main differential lever 14 transmits motion to the counters and registering wheels, as above described, it also shifts the corresponding member 96, and all members 96 to the right thereof, into a position with their channels 95 registering with the projections 93 Figs. 3 and 20 on the bell crank modifiers, and those channels are so formed that when the members 96 are raised, the depending arms of the bell cranks are drawn toward the square shaft, thus depressing the fulcrum pins 87 and additionally actuating the levers 80. This movement is sufficient in the registering wheels, to compensate for the two blank teeth.

The shifting movement of the members 96 along the square shaft is derived from any actuated lever 65, (Fig. 3) through the arm 100 thereof, pin 102 (on member 104) engaging notch 103 in said arm, oscillatory member 104, connecting bar 105, bell crank 106, (Fig. 20) rod 107, chain 108, (Fig. 81) link 109 and shifting arm 110 (Fig. 20) the latter being forked, and engaging a projection 111 on the corresponding member 96. The rods 107 are secured to tubular bosses 99, (Fig. 20) through which pass the pintles 101 connecting the chain links and serve to raise two links, in a similar manner to that in which the keys depress chain 20. The chain 108 is fixed at the left hand end, and therefore draws from right to left and from the point where the links are lifted, thus shifting all members 96 at the right of the lifted links, as well as the one directly affected by the lifted links. It will therefore be seen that inasmuch as any given main differential lever 14 transmits motion to a corresponding lever 65, this shifting of members 96 to the right of the one directly affected by such lever 14, will cause sufficient movement in all levers 80 at the right (as well as in the lever 80 directly affected), to revolve their registering wheels two tooth spaces and expose a cipher for printing on each such wheel. For example, assuming the units key in the hundreds column to be depressed, the position of its inserted selector pin 10 will be such that the differential lever 14 for the hundreds column will actuate its lever 65 to expose numeral 1 on the counting wheel, and will transmit sufficient motion through link 79 to expose a cipher on the registering wheel, the latter being moved a two tooth distance. The motion through member 104 and chain 108 however, will shift, (not only the member 96 representing the hundreds column, but those representing the tens and units column), to the left along the square shaft, so that when said shaft is actuated, the hundreds registering wheel will be additionally rotated to expose type numeral 1 for printing, and the units and tens wheels will be rotated to expose the ciphers, for these two wheels, in the case supposed, have received no motion from their differential levers 14.

III. (Figs. 15, 25, 26, 27, and 28.) All movements except the setting movements derived from keys or push buttons, originate in a main actuating lever 113, (Fig. 15) which, however, acts indirectly by storing power in a main or power storing spring 114 (Fig. 25). This lever is rigidly secured to a rock shaft 116, which is provided with a clutch arm 118, having a one way acting automatically reversing clutch, adapted to engage a curved frame bar 120 in a manner to prevent any retractive movement of the main lever after the beginning of a stroke, until such stroke is fully completed, this being necessary in order to insure the maintenance of the proper tension in the main spring. This clutch comprises two locking dogs or roller clutch members 122 on the arm 118, which are located on opposite sides of the frame bar 120 and in such a position that when in registry with notches 124, provided at the respective ends of the bar, they are permitted to swing past the line of their pivotal centers, in case the movement of the main lever is reversed. At all other points, a reversal of the lower movement causes them to grip the margins of bar 120. For example, when the lever is in normal position, it may be swung freely toward the front, the locking dogs assuming a slightly trailing position on the margins of the frame bar 120, from which they are moved by friction to binding position, if the lever is reversed at any intermediate point. When the lever has carried the dogs to the upper notches 124, however, the dogs enter these notches and a reverse movement of the lever causes them to swing and trail in the opposite direction.

Motion is transmitted from the main actuating lever 113 to a ratchet member 126, through an arm 128 (Figs. 22 and 23) on the shaft 116, bar 130, swinging arm 132 and a pawl 134, which, instead of retracting in the ordinary manner, is automatically rotated one complete turn and positively restored to actuating position after each stroke, thus avoiding the possibility of errors, such as may occur in the use of spring actuated pawls. The ratchet member 126 is rigidly mounted upon a hub sleeve 135, loosely supported on a shaft 136. A sleeve 127 is provided with a gear wheel 137, (Fig. 28), and the rotary pivot pin 138 of the pawl 134, is provided with a pinion 139, which meshes with said gear wheel.

The arm 132 is loose on the shaft 136 and when swung forwardly, the pawl engages one of the arms of the ratchet member, the said member, sleeve 127, and gear wheel 137 turning with the pawl and pawl supporting arm during such stroke. During the retractive stroke of the main lever and arm 128, the teeth of the then stationary gear wheel 137 cause the pinion to revolve, and this wheel and pinion are so proportioned that the pawl will revolve one complete turn over the next succeeding arm of the ratchet member and to a position of actuating engagement with its rear face. The ratchet member illustrated has six arms for engagement by the pawl, and moved slightly in excess of one sixth of a turn with each stroke of the main lever. It actuates the shaft sleeve 127 to wind up the main spring 114, one end of which is connected to the sleeve at 140 and the other end to the shaft at 141. (Fig. 25.)

A stop pawl 142 on the frame is employed to hold the ratchet member in the position to which it is advanced after each stroke of the main lever. This pawl is also provided with a pinion 143, which meshes with the gear wheel 137 and causes the pawl to revolve in the same manner as the pawl 134, but during the forward stroke of the main lever. When this pawl is revolved to a position for engagement with an arm of the ratchet member, the retraction of the actuating pawl 134 permits a slight retractive movement of the ratchet member until such arm is engaged by the stop pawl, the ratchet being then in a position exactly one sixth of a turn in advance of its previous position. The opposing faces of the ratchet member and pawl are preferably provided with interacting teeth to prevent slippage.

The spring supporting shaft 136 is employed as a main driving shaft, for a set of parallel cam supporting shafts, from which the accumulating, type adjusting and printing movements are derived. The driven shaft 150 is directly geared to the shaft 136 and a one sixth turn of the latter imparts a complete rotation to the driven shaft 150 through the gear wheels 151, 152, 153, 154, 155, and 156, the first of the train being fixed on shaft 136 and the last fixed on shaft 150, with the intermediate ones loose. The shaft 150, however, is normally locked against rotation by a cam controlled pawl 158, Figs. 26 and 27 pivoted to the frame at 159, and arranged to engage a notch 160 in a locking wheel 162.

The wheel 162 is directly supported by, and fast on shaft 150 (Fig. 28) and prevents the shaft from turning while the pawl is engaged in notch 160. During the actuating stroke of the main lever 113, motion is communicated from the sleeve 127 to disengage the pawl 158 through the gear wheels 166 and 167, pinion 168, gear wheels 169, 170 and 171, and unlocking cam 172, the latter being loose on the shaft 150 and provided with stud shafts which support the planetary gears 169 and 170. The gear wheel 171 is fixed to the shaft 150 and is stationary during this unlocking movement. The gear wheel 167 and pinion 168 are loose on the shaft 150. The pinion 168 is a little larger in diameter than the gear wheel 171 and the planetary gear 169 is of sufficient width to mesh with this pinion, and transmit motion to the planetary gear 170, which meshes with it and also meshes with the gear wheel 171, and steps around the latter during this movement, thus imparting motion to cam 172. This unlocks pawl 158 which is provided with an arm 176, engaging in the cam groove 178. The movement of cam 172 above described, may consist of approximately a one fifth turn, and the cam groove 178 is so formed that such movement will lift the pawl 158 from notch 160 in which it engages, whereupon the shaft 150 is rotated one complete turn from shaft 136 through the train of gear wheels 151—156. The gear wheel 167 and pinion 168 however, become stationary with the completion of the unlocking movement upon completion of the actuating stroke of the main lever, and the rotation of shaft 150 now causes planetary gear 169 to step around pinion 168 and impart additional rotation to the cam wheel 172, whereby, as the shaft 150 completes its revolution, the cam wheel has moved a distance sufficient to complete a half revolution from the original starting point or locking position, and causes the pawl 158 to reëngage in notch 160. Shaft 150 is therefore again locked after a single complete turn. When rotating, the motion of shaft 150 is controlled by a fly fan 180, which is driven from the shaft through worm wheel 181 and shaft 182.

IV. The motion of the shaft 150 is communicated to all of the main differential levers 14 through a main actuator cam 184, (Fig. 15) bell crank 186, connecting bar 187, crank arm, 188, shaft 189, and the cranks 15 and pins 16 above described (Fig. 3). The cam groove 185 in cam 184 receives a stud 190 carried by the bell crank 186, and is so formed that about one third of a revolution will actuate the differential levers, the cam then holding them in raised position for about one third of a revolution, after which, the cam again depresses the levers in returning to normal position. During this rotation of shaft 150, an auxiliary actuator cam 192 on said shaft oscillates square shaft 98 to actuate all modifiers engaged by shifted members 96, through bell crank 196, connecting bar 197 and an arm 198, thus additionally rotating the type wheels to compensate for the two blank spaces as above explained.

The motion of shaft 150 is transmitted to a shaft 200, (Fig. 25) (which supports the cam variables), and to a shaft 202, (which supports the printing cam and platen rotation and ribbon feed cam), through the gear wheels 203, 204, and 205, fast on the shafts 150, 200, and 202, respectively. The printing cam comprises two members 206, and 208, (Figs. 3, 31 and 32) provided with peripheral notches 209 and 211, at diametrically opposite points on the respective cams. A pair of bell cranks 210 and 212 are mounted upon a cross rod 213 with one arm of the bell crank 210, bearing upon the periphery of cam member 206 and the corresponding arm of the bell crank 212 resting upon the periphery of cam member 208. These arms of the bell cranks are connected by a tension spring 214, whereby when the rotation of the cam brings the notches 209 and 211 into registry with the crank arms, the latter move with a quick positive motion into the notches. This motion is transmitted from bell crank 210 to impart the printing stroke to the type wheel through connecting rod 214 and lever 215 to a swinging cage 216, which is pivoted to the trunnions 217, (Fig. 12) and in which the gears 85 and 86 and type wheels 78 are mounted. The motion of bell crank 212 is transmitted through connecting rod 218 to a bell crank 220, which carries a locking fork 221 adapted to engage one of the projections on the type wheel and accurately center it and hold the wheel in position during the printing stroke. The lever 215 carries an arm 222, which engages a cross rod 223 and the lever transmits its motion to the cage through this arm and cross rod, thus imparting to the cage a free and positive stroke. A spring 219 is preferably employed to slightly retract the registering wheel after the printing stroke.

A cushion stop 224, located on the casing, is adapted to enter the spaces between the teeth of gear wheel 86 during the printing stroke. Two of these spaces 225, corresponding in position with the blanks on the type wheel 78, are partially filled and the filled portions of all wheels in normal position, strike the cushion during the printing operation, thus relieving the momentum strain which would otherwise be exerted on the cage 216 and on the types.

While printing, as above described, certain secondary operations are performed by variable cams on shaft 200, these cams being also revolved one turn for each stroke of the main actuating lever 113. In normal printing, an elbow crank 230 engages a cam groove 232 in the variable cam 234 and transmits motion from said cam to the eccentrics 76, through a connecting bar 236 (Fig. 15) and crank pin 238, the latter being connected with the shaft 74 upon which the eccentrics 76 are mounted. (Fig. 3.) The cam groove is so formed as to leave the rack bars 68 out of engagement with the counting wheel pinions during the up stroke and move them into engagement with the pinions preparatory to the down stroke, as heretofore explained. During the same operation, an elbow crank 240 engages a cam groove 242 in the variable cam 244 (Fig. 25) and transmits motion from said cam to the transferring wheels 246, (Fig. 68) through the connecting bar 248, (Fig. 13) rack bar 250, rack 251, pinion 252, coupling member 253, (Fig. 63) and shaft 254, the transferring wheels being mounted on said shaft. There are different sets of transferring wheels, each mounted upon a similar shaft and interchangeably, adjustable into engagement with coupling member 253, as hereinafter explained, but with each of the sets, when in use, the rotative operation is the same. The rack maintains continuous engagement with pinion 252 during the entire revolution and cam 244 actuates the transferring wheels in one direction during a part of such revolution, and then returns them to normal position.

During the transferring operation, hereinafter described, the transferring wheels are automatically shifted by the counting wheels one step to the left preparatory to any given transferring operation. In key printing operations, they are restored to normal position by means of the cam 260. (Figs. 48 and 25). An elbow crank 262 engages in a cam groove 264 in this cam, and its motion, derived from the cam, is transmitted to the square shaft 254 and transferring wheels through connecting bar 266, (Fig. 13) arm 267, and sleeve 268, the latter being arranged to support the coupling member 253, and having a diagonal slot 269, (Figs. 63, 64 and 66) in which a fixed frame pin 270 engages, whereby a partial rotation of the sleeve, when arm 267 is swung, will produce a lateral movement, (to the right) in the sleeve, thus moving the coupling and shaft 254 in the same direction. The shaft 254 is provided with projections 272, (Fig. 63) which engage all transferring wheels which are out of normal position and restore them to normal position during this movement.

The key latches (bars 42) are released on completion of the printing operation by means of a cam 275, (Figs. 49 and 25) which communicates motion to the latches through an elbow crank 276, having one arm engaged in the cam groove 278, and through the vertical connecting bar 280, (Fig. 15)

bell crank 282, connecting bar 283, rocking member 285, stud pin 286, bell crank 287, arm 288, cross shaft 56, arms 58, and studs 59. The rocking member 285 is pivoted to the shaft 90, and the connecting pins 286 and 291 on bell crank 287 engage in slots 292 in the arm 288 and a swinging supporting arm 293 respectively, thus permitting the transmission of motion through this bell crank 287 without binding. It will also be observed that the bell crank is pivoted at 294 upon the rocking member 285. The supporting arm 293 is rigidly secured to a rocking cross shaft 295, which is provided with an arm 296 (Figs. 15 and 23) extending downwardly with an extremity having a segmentally curved under surface adapted to ride upon a segment 298, carried by the shaft 116 of the main actuating lever 113, when such lever is actuated. A frame pin 299 prevents arm 296 from lifting above the segment, but when lever 113 is in normal position, arm 296 is free to swing downwardly past the end of the segment. This downward movement occurs whenever a key is depressed in normal key printing and is derived from the key projection 54, Fig. 3 which actuates the corresponding latch bar 42 and oscillates arm 58, cross shaft 56, arm 288, (Fig. 15) bell crank 287, and supporting arm 293. The object of this arrangement is to utilize these latch releasing connections in connection with arm 296 and segment 298, to lock all the key latches and prevent the depression or restoration of keys after the main actuating lever has commenced its movement and until the latches are actuated from cam 275. Arm 296, when depressed coincidently with the depression of a key, also locks main actuating lever 113 against movement.

V. The accumulator and transferring wheels are mounted in a carrier 300, (Figs. 3 and 63) the accumulator wheels 62 being supported on shafts 301, and the transferring wheels 246 upon the cam actuated oscillatory square shafts 254, above described. Six shafts 301 and six shafts 254 are employed in the construction illustrated, these being arranged in pairs, and each pair contains a complete set of accumulator and transferring wheels, only one pair however being in operative position at any given time. The carrier shaft 305 may be rotated step by step to bring the different pairs into operation, in order to permit a coördinate computation of items of different character,—items of one character being carried by one set of wheels, and those of another character by another set of wheels, etc. In this manner all the data from a single written instrument may be received by the machine in sequence. This will be more fully explained in connection with the description of the platen carriage.

Each accumulator wheel is provided with annular peripheral grooves 302, and 304, (Fig. 75), which, at one point, are connected by a diagonal open channel 306, and beyond which, (in the sense of normal rotation), the groove 302 is blocked, as shown at 303. The transferring wheel back of this counting wheel, is provided with a segmental rib 308, which normally engages in the groove 302, but as the counting wheel completes its revolution and moves to obscure a numeral 9 and expose a 0, the rib 308 encounters the block 303, which constitutes a portion of the angular wall of channel 306, and which causes the rib 306 to move along said channel to the groove 304, thus forcing the transferring wheel to the left along its supporting square shaft 254, (Fig. 63) to a position for actuating the next counting wheel, through a single tooth 310 carried by the transferring wheel and which by this movement is adjusted into a position for engagement with the pinion 70 on such next counting wheel, but below the point of actual engagement with such pinion. This tooth engages and actuates the pinion 70, one step during the movement derived from the cam groove 242 and elbow crank 240, and transmitted through rack 251 and pinion 252 to the square shaft 254, as above described.

The teeth 310, 310$^a$ to 310$^h$, inclusive, (Figs. 67 to 72) on successive transferring wheels of any given set, are each located one step in the rear of a point corresponding with that occupied by the tooth on the preceding wheel, so that when the transferring wheels are oscillated from the cam 244, the motion of the units transferring wheel will be transmitted to the tens accumulator wheel in time for the latter to actuate its transferring wheel and make a further transfer to the hundreds accumulator wheel, etc., in case the units transferring operation should complete the revolution of the tens accumulator wheel. For example, assuming that the number 999 is indicated by the accumulator wheels, the addition of 1 will complete the revolution of the units wheel and shift the units transferring wheel, (as above explained), into position for engagement with the pinion 70 of the tens accumulator wheel. When cam 244 actuates square shaft 254 for the transferring operation, the tooth 310 of this wheel engages said pinion 70 and rotates the tens accumulator wheel one step and this wheel immediately shifts its transferring wheel into position for the engagement of its tooth 310$^a$ with the pinion 70 of the hundreds accumulator wheel, such engagement being immediately accomplished by the continued rotation of the square shaft. As the hundreds wheel completes its revolution, its transferring wheel is shifted, the tooth 310$^b$ then occupying the same relative position with reference to the pinion of the thousands counting wheel, as the tooth 310 of the units counting wheel occupied preparatory to the initial movement of cam 244, and the continued movement of this cam thereupon moves the thousands accumulator wheel one step, thus exposing a total of 1000, after which the cam 244 continues its rotation and oscillates all the transferring wheels, to a point where the tooth on the left hand transferring wheel has passed the position of pinion engagement, after which said transferring wheels are all retracted to normal position. During the retractive portion of their oscillation, the hundreds, tens, and units transferring wheels will be shifted to the right, back to normal position on square shaft 254, by the action of cam 260, as above explained. The ribs 308 on each transferring wheel are cut away or recessed at 312 to permit this movement and allow said ribs to reëngage in the grooves 302 of the respective accumulator wheels, during the completion of the retractive oscillation. During this retractive oscillation, the teeth 310, 310ᵃ, etc., swing backwardly at the right of their respective pinions.

The accumulator wheels are each locked at all times, except during the actuating movements of rack teeth 69 and at the interval at which a transferring operation will take place. The locking means comprise bell cranks 314 pivoted to a cross rod 316 and provided with dogs 317 adapted to engage between the teeth of the respective pinions 70. Each of these levers is provided with a stud 318, which normally engages in a segmental channel 320 in the corresponding transferring wheel, which channel is provided with an inward radial offset 321 at one end immediately in the rear of normal stud engagement. The cam 244, which oscillates these transferring wheels has its groove 242 so formed that the initial movement of this arm communicates a short backward oscillation to the transferring wheels, preparatory to the forward or carrying oscillation above described, and this backward oscillation, causes the studs 318 to move into the offsets 321 and thus actuates the bell cranks 314 to swing the dogs 317 to pinion releasing position pending the actuating stroke of the rack teeth 69. The teeth of the several racks are all in engagement with the respective pinions 70, during this interval of dog release, and therefore all pinions are locked by their respective racks except as actuated thereby. As the racks complete their stroke, the cam 244 reaches a position where it oscillates the square shaft and transferring wheels forwardly, and the studs 318 then swing outwardly into segmental portion 320 of the channel, causing the dogs 317 to reëngage the pinions and lock them during the transferring oscillation.

Where a transferring operation is to be performed, however, the lateral shifting movement of an acting transferring wheel, above described, causes the corresponding stud 318 to engage more deeply in the channel 320 and this deeper portion is provided with an inward radial offset 324, which so corresponds in location on the wheel with reference to the transferring tooth 310 on such wheel, as to swing the corresponding dog 317 to unlocking position during the transferring interval, viz:—the interval of tooth engagement with its pinion 70. As the tooth passes out of engagement with such pinion, the dog 317 again moves to locking position, and remains there during the forward or working oscillation of the transferring wheel. The retractive lateral shift of the transferring wheels caused by cam 260, takes place at the beginning of the retractive oscillation of the transferring wheels, (or at the end of the forward oscillation), so that the studs 318 no longer enter the deeper portion of the channel 320, and are therefore not affected by the offsets 324.

VI. Certain special operations of the machine are required, which modify the action of the parts heretofore described. These special operations are performed by the variable cams on shaft 200, (Fig. 25) each of which is provided with a plurality of cam grooves (Figs. 35 to 54) in which motion transmitting elbow cranks selectively engage. These cam grooves in any given cam are located at different depths (i. e. in different planes transverse to shaft 200), and are co-incident with each other, except at the points where, in the rotation of the cam, variations in the mode of operation are required. Each of the variable cams 234, 244, and 260, has two grooves in each of its side faces and the grooves of each pair coincide with each other in normal position. A master cam 342 is also provided at its left hand end with a pair of grooves in the end opposite cam 234, and a jack actuator cam 343 is also provided with a pair of grooves in the side face which opposes cam 260.

Each of the elbow cranks 230, 240, and 262, and a jack actuating elbow crank 344 is supported upon a cross rod 231 (Figs. 3 and 15) and is arranged with one of its arms extending between two of these cams, and is provided with a cross pin 345 (Fig. 25) which carries head pieces or rollers 346 at its respective ends, each adapted to travel in either one of the pair of grooves in the side face of the cam opposing it. The cross pins 345 are of such length that but one of the head pieces will be engaged in any given position of cam adjustment. It therefore follows that each of these elbow cranks may be engaged in any one of four different grooves, according to the position of the cams. These cams are all mounted upon the shaft 200 along which they are shifted to the four positions by means of a manually actuated master key operating in conjunction with the master cam 342 to which all the other cams are operatively connected. The master cam is provided with a key way 350, into which the master key extends, this key comprising a bar 352 (Fig. 15) provided with a cross piece 354, the ends of which abut the side walls of the key way. The key is adjustable radially into four positions in the key way but is held against movement along the shaft. The side walls of the key way are formed with segmentally offset faces 355 and oppositely offset opposing faces, (Figs. 56 to 60) so arranged that each change in the radial adjustment of the master key will cause the master cam to shift to a different position during its revolution. The opposing side walls are substantially counterparts of each other, in that wherever an inward offset is formed on one side, there is a corresponding outward offset on the other, the diameter of the key way being in all places substantially equal to the length of the cross piece 354. In the normal position of this cam, the portion 360 of the key way then occupied by the key, has straight sided walls which allow the key to be moved radially to or from any one of its four positions, as shown in the developments of this master cam in Figs. 56 to 60 inclusive.

The movements produced during normal key printing have already been described, the key being then in the inner position, (nearest the shaft 200), where the key way walls are annular. It is adjusted in the next outer or second position for printing totals, in the third position for printing subtotals, and in the fourth or outer position for printing without adding. In the second or total printing position, the master cam and those it controls (all the cams on shaft 200) are shifted to the right during the initial rotary movement of the cam,—in the third or subtotal position, they are shifted to the left,—and in the fourth or printing without adding position, they are shifted to the left of the normal or inner position, but to a less distance than that of the third position. In all positions, however, the operations of the main actuator cam 184, the auxiliary actuator cam 192, and the printing cams 206 and 208 are the same as above described for normal key printing, these cams being on the shafts 150 and 202 respectively.

*Printing totals*, (Figs. 3–13, 25, 29 to 34, 40 to 44, and 58.)—It has already been explained that in normal position, cam 234 actuates the racks 69 into and out of engagement with the pinions 70 of the counting or accumulator wheels, at the beginning and end of the down or retractive stroke of the rack. Also how the cam 244 rotates the transferring wheels and cam 260 moves them laterally, and cam 275 on the outer end of the master cam releases the key latches. In the second or total printing position of the master key, the master cam moves to the right, causing elbow crank 230 to disengage from groove 232 and engage in the companion groove 362. (Fig. 40.) In this position, the rotation of the cam 234 actuates the eccentrics 76 (Figs. 3 and 15) to move the racks 69 into engagement with the pinions 70 of the counting wheels preparatory to the up stroke of the racks, and then removes them during the down stroke, the motion of the elbow crank 230, when engaged in this groove, being in the opposite direction from its motion during normal key printing, and differently timed so as to initially actuate the eccentrics 76 to put the racks into operative position, and remove them at the end of the up stroke.

In normal key printing (first position of master key), the elbow crank 344 is engaged in an annular groove 372 in the jack actuator cam 343, from which therefore no motion is transmitted. In the second or total printing position, this cam is shifted to engage the elbow crank 344 in cam groove 374, which is an eccentric groove, (Fig. 43), and this cam then actuates the elbow crank to transmit motion to a key jack now to be described, the function of which is to automatically select and depress keys on the key board representing the total number displayed by the counting or accumulator wheels, and which, of course, is the sum of all numbers registered.

One jack frame 380 is employed for all the rows of numeral keys on the key board, and is provided with a set of sliding bars 382, one for each row of keys, operated from the corresponding accumulator wheel 62 to select a key in any given row corresponding in value with the exposed numeral on such wheel, after which the jack frame is automatically depressed to operate the proper keys and selector pins 10, preparatory to the movement of the differential levers 14 which actuate the printing wheels. Each sliding bar 382 is provided with lateral projections 384, (Fig. 75) progressively arranged at different distances from the adjacent keys, and adapted, when the bar 382 moves longitudinally in the frame, to cause said projections 384 to successively move to positions directly above lateral key projections 386. In the construction illustrated, the projection 384 next to, and in the rear of the 9th key, (Fig. 3), is in close proximity to the projection 386 on that key. The projection 384 in front of this rearmost one, is located at a greater distance from key projection 386 on the 8th key, etc., projection 384 in the rear of the first key being at the greatest distance therefrom, and therefore the last, in a forward movement of bar 382, to reach a position, where a depression of said bar will actuate this key. To actuate the bar 382 to the desired distance, each counting or accumulator wheel 62 is provided with an eccentric groove 390 (Fig. 7), which progressively recedes in a helical curve from the counting wheel shaft, starting from a point representing the numeral 1 thereon, (although not necessarily coincident therewith on the same radial line), to the point representing the cipher, the groove then abruptly turning inwardly to the starting point. A bell crank 392 for each counting wheel has one arm engaged in this groove, and another arm provided with a fork 394, (Figs. 7 and 3), which is in a position to receive a stud projection 398 on the take off lever 400. This lever is pivoted at 402 to one arm of a bell crank 404 loosely mounted on rock shaft 406. The shaft 406 is provided with an arm 408 keyed thereon, and connected with lever 400 by a link 410, whereby an oscillation of the shaft to swing arm 408 rearwardly, will actuate lever 400 and push the projection 398 into the crotch of the fork 394. When the fork is so positioned that stud 398 is lifted in moving into the crotch of the fork, its upward movement is transmitted through the bell crank 404 to bar 382 to move said bar forwardly, the bar being provided with a yoke 412 loosely engaged by a stud 414 carried by the raised arm of bell crank 404. The degree of movement of bar 382 is therefore dependent upon the position of the counting wheel, the bar movement being greatest when the fork 394 is raised, and no movement being transmitted when the fork is depressed to its lowest position, which occurs when the cipher on the counting wheel is exposed through the sight opening 416. The movement of bar 382 thus derived from the wheel 62 is therefore inversely proportioned to the value of the keys or the exposed counting wheel numerals, and the arrangement is such that the movement in any given position of the counting wheel will be that required to move the bar 382 to a position for engagement of the proper bar projection 384 with a key projection 386 on the key corresponding with the exposed counting wheel numeral. The bell cranks 404 for each row of keys are of course independently mounted on shaft 406, and each takes its movement from the counting wheel, which receives its motion from the row of keys to which the bell crank pertains. The jack frame 380, however, carries all the sliding bars 382, and after the latter are positioned for engagement with the proper keys, this frame is depressed to set all the engaged keys, and insert corresponding selector pins preparatory to operating the main differential levers 14 to print the total sum represented by the depressed keys. The jack frame 380 is supported upon elbow cranks 420, (Fig. 13), which are fixed on cross shafts 421 under the front and rear portions of the key board and connected by side links 422. These elbow cranks are oscillated to depress the frame and set the keys by means of cam 343.

Motion to set the keys for printing totals is transmitted from the jack actuator cam 343, (Figs. 13, 25 and 42), to the take off levers 400 (Figs. 3 and 13), through the elbow crank 344, connecting bar 424, Geneva movement lever 426 and member 428, (Fig. 75), the lever 426 being provided with a segmental head piece 427, provided with a notch 429 in which a pin 430 carried by the member 428, normally engages, whereby member 428 is initially oscillated until the pin passes out of notch 429 and travels along the curved surface of head piece 427, which thus holds member 428 from returning to normal position pending the return of lever 426. The member 428 is fast on rock shaft 406, and this movement of the member 428 swings arms 408 to set the take off levers 400, as above explained.

Motion is also transmitted from bar 424 to one of the elbow cranks 420 to depress the jack frame 380. This motion is slower than that through the Geneva movement member 428, which acts only during the initial movement of bar 424, and the key selecting bars 382 are therefore all positioned by the take off levers 400, before the jack frame 380 has moved far enough on its down stroke to bring projections 384 into contact with the key projections 386, which occupy a somewhat lower position. These selective movements of the sliding key selecting bars 382, and the key depressing movement of the jack frame, are completed prior to the upward movements of the main differential levers 14, which then transfer the values represented by the set keys to the type wheels 78, and also impart an upward stroke to the racks 69, which restore all counting wheels to the zero position. The groove 362 in cam 234 is so formed that the elbow cranks 230 are then actuated to swing eccentrics 76 to normal position and remove the racks 69 from the counting wheel pinions 70, preparatory to the down stroke of the racks.

The type wheels are actuated to print the totals in the same manner as in normal key printing, but preparatory thereto are rotated one step farther, as hereinafter explained, in order to print with the italic types.

The transferring wheels have no movement, except a backward movement sufficient to actuate the counting wheel locking dogs 317 to unlocking position, by shifting engagement of bell cranks 314 to the radial offset 321, (Fig. 68), at the end of channel 320 in the transferring wheel. The wheel remains in this position pending the up stroke of the engaged racks, and then returns to normal position and locks the counting wheels at zero. This unlocking movement of the transferring wheels is due to the fact that cam 244 has been shifted to the right to engage elbow crank 240 in the inner groove 434, which is annular in form except for one offset, (Fig. 41), sufficient to transmit this backward motion to the transferring wheels through the elbow crank 240, the intervening connections, and square shaft 254, and return it to normal position after the required interval. Cam 260 is also shifted to the right, engaging elbow crank 262 in cam groove 436, (Fig. 42), but this groove is annular in form and therefore no lateral motion is transmitted to the transferring wheels, this being unnecessary as no carrying operation takes place in taking totals. The master cam 342, in shifting to the right, engages elbow crank 276 in cam groove 438, (Fig. 44), whereby the cam 342 actuates elbow crank 276 to rock the latch releasing cross shaft 56, and move all the latches to key releasing position preparatory to the depression of the key jack. This is necessary for the reason that the jack movement takes place while the main actuating lever 113 is out of normal position, and arm 296 is therefore locked by main actuator segment 297 and cross shaft 56 cannot be oscillated except by transmission of motion from master cam 342 to oscillate the member 285. After the jack has been depressed, cam groove 438 is so formed that the key latches are again locked and so remain until finally released just before cam 342 completes its revolution.

*Printing sub-totals.*—As above stated, the master key is shifted to the third position for printing sub-totals. In this position, the master cam 342, together with the other variable cams 234, 244, 260, 275, 341, and 343 are shifted by the master key to the extreme left hand position at the beginning of their rotary movement. This withdraws the cams from all of the left hand head pieces 346 of the elbow cranks (except that of the latch elbow crank 276), the head piece of which is adapted to enter four grooves in cam 275. In the new position of adjustment, elbow crank 276 will engage in a groove 450 in cam 275. At the same time, the right hand head piece of elbow crank 230 engages the inner groove 452 in cam 341. Also right hand head piece of elbow crank 240 engages the inner groove 454 at the left side of cam 234 and elbow crank 262 engages the inner groove 456 at the left hand side of cam 244, while elbow crank 344 engages the inner groove 458 at the left hand side of cam 260.

Groove 458 is identical in form with groove 374 in cam 343. The movement of the key jack is therefore the same as the above described movement for printing totals. Groove 456 is identical in form with groove 436, being merely an annular groove so that no lateral shifting movement is communicated during this operation to the supporting shaft of the transferring wheels. Grooves 454 and 452 are annular in form, therefore no motion will be communicated to the elbow cranks 230 and 240. No motion is desired in the counting wheels when printing sub-totals and therefore eccentrics 76 controlled by elbow crank 230 are left in normal position with the racks 69 out of engagement with the counting wheel pinions 70 throughout both the upward and downward stroke. It follows that it is unnecessary and undesirable to unlock the counting wheels, and the unlocking oscillation of the transferring wheels described in connection with cam groove 434 is therefore omitted. Cam groove 450 in cam 275 has the same form as groove 438 and the latches are therefore moved to release position preparatory to the downward movement of the key jack, the same as when printing totals. It will therefore be understood that the operation for printing sub-totals is the same as the operation for printing totals, except that the counting or accumulator wheels are left in whatever position they might have reached instead of being restored to normal, as is done when printing the final total.

*Printing without adding.*—When it is desired to use the machine for key printing without adding, the master key is adjusted to the fourth or outer position in the master cam 342, whereupon such cam will, at the beginning of its rotation, be shifted to the left a shorter distance than when said master key is in the third position. In this fourth position of the master key, elbow crank 276 will be engaged in a groove 460 in cam 275. Elbow crank 230 will be engaged in a groove 462 in cam 341. Elbow crank 240 will be engaged in a groove 464 in the left hand side of cam 234, elbow crank 262 will be engaged in a groove 466 in the left hand side of cam 244 and elbow crank 344 will be engaged in a groove 468 in the left hand side of cam 260.

The groove 460 controlling latch release is the same in form as groove 278 employed in normal key printing. All the other variable cam grooves pertaining to this position, viz. grooves 462, 464, 466, and 468, are annular in form and the variable cams, therefore, when in this position transmit no motion to the elbow cranks 230, 240, 262 and 344. It follows that the racks 69 will be left out of engagement with the counting wheel pinions 70 since the eccentrics 76 are not actuated. The transferring wheels will be neither rotated nor shifted since they receive no motion from the counting wheels and none from the elbow cranks 240 and 262, which control the oscillatory and shifting movements respectively. The key jack 343 will also remain stationary.

*Means for shifting the master key.*—The master key bar 352 (Fig. 15) is slidingly mounted in a frame bracket 470 and whenever the master key is out of normal position, the cross piece 354 engages angular guides 472, (Fig. 55), in the key way of the master cam during the final movement of such cam and these guides push the cross piece 354 inwardly to the inner position or base portion of the key way, the cross piece, however, passing beyond these guides 372 as the master cam completes its rotation so that this cross piece is then in a position where it can be withdrawn radially to any one of its other three possible positions of adjustment. The master key is manually adjusted from its normal or inner position to one of the other three positions by means of shifting keys 474, 476 and 478, (Fig. 15) which, when depressed, move the master key to its second, third and fourth positions respectively, the motion of any one of these shift keys being transmitted to the master key by means of the floating levers 480 and 481, link 482, elbow crank 483, connecting bar 484 and elbow crank 485. The lever 480 is pivotally connected at its respective ends to the shift keys 474 and 476 and is also pivoted to lever 481 at a point 490, which is nearer to the shift key 476 than it is to the shift key 474. The shift key 478 is pivotally connected with the lever 481 at the opposite end from the point 490 and the link 482 is pivotally connected to the intermediate or central portion of this lever 481. With this arrangement when the shift key 474 is operated, it swings lever 480 upon shift key 476 as a fulcrum and thus depresses lever 482 a short distance, this motion being transmitted through the link 482, etc., to move the master key to the second position, which is the position for printing totals. When key 476 is depressed, lever 480 swings upon key 474 as a fulcrum, actuates lever 481 twice as far as it is actuated by key 474, the point 490 being only half as far from key 476 as it is from key 474. This movement is sufficient to actuate the master key to the third position for printing subtotals. When shift key 478 is actuated, lever 481 swings upon the point 490 as a fulcrum and imparts a motion to link 482, which is three times as great as the motion communicated thereto from key 474, this motion being sufficient to actuate the master key to its fourth position for printing without adding.

It has heretofore been explained that the totals and subtotals are printed in italics, this being accomplished by rotating each of the type wheels one step farther than they would normally be moved through the setting or depression of keys 1. This additional one step movement of the type wheels is derived through the modifier eccentrics 92, which support the bell crank modifiers. When either one of the shift keys 474 or 476 is depressed, the eccentrics 92 of all the modifiers are oscillated to depress the modifier pivots, this motion being transmitted from the floating lever 480 to the eccentrics through the link 492, lever 493, link 494, arm 495 and cross shaft 90, with which the eccentrics have fixed connection. Lever 493 is pivoted to the frame at 496 and the movement of the eccentrics is such that sufficient motion will be transmitted through the lever 80 (Fig. 3) and the intervening connections above described, to move each actuated type wheel one additional step, thus exposing italic numerals in position for printing.

It sometimes occurs that the same number is to be repeatedly added. To avoid resetting the same keys, a shift key 500 is employed, which will be hereafter termed the repeat key. This key is provided with a foot piece 502, having a horizontal slot 503. A pin 504 on the connecting bar 283 of the latch release mechanism, engages in this slot, (Figs. 61 and 62), whereby, in normal key printing, this pin moves back and forth in the slot when the connecting bar 283 is actuated to release the latches. This connecting bar is normally loosely secured to the rocking member 285 by means of the pin 504 engaging in a vertical channel 507 in an offset block 508 on said rocking member 285. A depression of the repeat key 500 pushes this end of the connecting bar 280 downwardly until the stud 506 moves out of the channel 507 to a position below the block 508, thus disconnecting the bar 283 from the rocking member 285 and preventing a release of the key latches. The keys 1 will therefore remain depressed during repeated operations of the main actuating lever 113, thus repeatedly printing the same number and adding the same number repeatedly to the total indicated by the counting wheels. It will be noted that as pin 506 moves out of channel 507, pin 509 attached to 502 enters the channel from above, thus holding piece 285 in position to reëngage pin 506 when 500 is restored. It is also necessary to hold piece 285 stationary under these conditions, in order that lever 287 may be oscillated by a depressed key to lock the main actuator lever through arm 296. (Fig. 15.)

VII. (Figs. 2, 3, 20, 24 and 76.) Special keys are provided for columnizing. Referring to chain 108, through which, and the bell crank modifiers, a two step movement is transmitted to the type wheels to compensate for the blank teeth on such wheels, it will be observed that the several members or links of this chain are normally connected by pintles 101 which extend rearwardly through a slotted wall 511 of a channeled member 512, in which the chain rests. A set of specializing keys 514,—one for each row of keys 1, or for each pintle 101 of the chain 108,—are mounted in the casing, and each of these specializing keys is provided with a shoe 516 at its rear end, which is offset downwardly and extends under the member 512 and is provided with an upwardly extending fork 518 loosely engaging the projecting rear end portion of the pintle 510, the latter being preferably provided with collars 520 between which the fork arms extend. By pushing one of the keys 514 inwardly, the corresponding pintle may be withdrawn sufficiently to disconnect the chain, the extreme inward movement of the key however, being merely sufficient to withdraw the pintle from but one of the links, the ends of which are arranged to lap as shown. The shoe 516 carries a pin 522, which, when the key is pushed inwardly, extends through an aperture in the front wall of the channeled member 512 and enters the pintle aperture in the link, as the pintle withdraws therefrom, thus locking this link to the frame. When this is done, the chain will be subdivided into sections, all chain movements at either side of the inwardly pressed key being independent of the other. Movements derived through setting keys 1 in the left hand portion of the key board, will therefore be ineffective to cause cipher printing in the right hand type wheels, as would be done if this chain were continuous and therefore capable of shifting the right hand members 96 and thus operating the bell crank modifiers for the two step type wheel movement, above described. All figures indicated upon the counting wheels, or printed by the type wheels at the left of the inwardly pressed key, may therefore be regarded as pertaining to a different column. In such cases, if the third specializing key 514 is pushed inwardly, the fourth row of keys on the key board will not be used, the counting wheels 62 corresponding with this row being used solely to receive the transfers from the hundreds column.

The shifting movement of the keys 514 is a short one. An incomplete movement however will lock the machine by leaving pintle 101 and shoe pin 522 both engaged with the same link. But a spring actuated latch bar 526 is preferably employed, which engages notches 528 in the key bar and indicates to the operator, (as it snaps into place and produces a slight jar in the key), that the movement is completed. This latch bar 526 is connected with and supported by levers 530, (Figs. 13 and 76), which are fulcrumed at 532 and actuated to locking position by a spring 534. The other arms of these levers are locked by a cam 536 on main actuator shaft 116, when the main actuator lever 113 is out of normal position.

VIII. The platen supporting carriage 550, platen 552, ribbon feed and spacing mechanisms, may be of any ordinary construction, and are therefore not herein illustrated and described with particularity, except as to certain novel features which directly pertain to this invention. One of these features comprises the means for rotating the counting wheel carrier 300 to expose different sets of numeral wheels 62 at the sight opening, this motion of the carrier 300 being derived from the carriage 550 which, when shifted, to substitute another column for printing, automatically shifts the carrier to substitute another set of counting wheels 62, through the rack bar 556 carried by the carriage pinion 558, worm 560 and worm wheel 562, the latter being axially mounted on one end of the counting wheel carrier frame. This rotary movement of the carrier frame is also transmitted to an index wheel 570, mounted on one end of the shaft 79, which supports the type wheels 78, through the train of gears (Fig. 15) 564, 565, 566, pinion 567, gear wheels 568, 569, and 570. This index wheel 570 is provided with index characters, (Fig. 16) each of which represents one of the sets of counting wheels 62, and where there are six sets of such wheels, the gears are so proportioned that a one-sixth turn of the counting wheel carrier will produce a one sixth turn of the index wheel, which, of course, will in such case be provided with six equi-distant index characters. This enables the operator to observe from the character printed by the index wheel which set of counting wheels is in operation.

While the counting wheel carrier is being shifted, the main actuating lever 113 is locked by an arm 571 which is pivoted to the frame at 572 and provided with a member 574, which engages in a channel 576 in one end plate 578 of the carrier frame. This channel 576 is provided with inward radial offsets 579, which so correspond in position and number, with the sets of counting wheels, that the arm 571 will be lifted whenever a set of counting wheels is in position of use, and depressed at all other points. When depressed, the lower end of arm 571 engages a shouldered projection 580 connected with the main actuating lever 113 or its shaft 116 and locks it against movement. When lifted, the arm 571 rises above said shoulder, and releases lever 113. A spring 582 is preferably employed to balance the weight of arm 571, thus making it possible to provide abrupt offsets in the channel 576, so that whenever an operator turns the carrier by hand, he can tell by the feeling when the wheels are in correct position, there being a slight jar followed by increased resistance.

It is desirable that the printing be done at a point where the types cannot be interfered with, and that the platen be then revolved to a point where the printed number will be exposed to view. For this purpose, the platen is partially rotated preparatory to its printing stroke to carry the printing line downwardly to a point underneath the platen or to a point protected by the portion 584 of the casing. (Fig. 13). After the printing operation, the platen is rotated backwardly to expose the printing above the casing. This motion is derived from the shaft 202 through a cam 586, (Fig. 25) elbow crank 588, link 590, (Fig. 13) lever 592, lever fork 594, lever 596, segment 598, pinion 600, shaft 602, crank 604, crank rod 606, elbow crank 608, arm 609, and gear wheel 610, the latter being fast on the platen roller. The arm 609 engages in successive spaces between the gear teeth during the step by step movement of the platen in line spacing, but the mechanism for accomplishing this function forms no part of the invention herein claimed, and it is therefore not shown or described.

The tabulator cam 612, (Fig. 14), on the upper cam shaft 202 transmits motion to an escapement mechanism at 614, (Figs. 13 and 25) through an elbow crank 616, fork 618, arm 620, shaft 621, and escapement member 614, the shaft 621 being provided with an arm 622, which, when the escapement is released, raises a tabulating stop 624 and limits the movement of the platen supporting carriage 550. The escapement and stop mechanisms are adapted from those in common use, in typewriting machines, and are therefore not shown or described in detail. The unlettered parts shown in connection with the carriage pertain to these mechanisms and to the ribbon feed and reversing mechanisms, etc., none of the features of which are claimed herein.

The worm shaft 559 is preferably mounted in a bearing sleeve 630, (Fig. 15), which is pivoted to the frame casing at 632, and may be swung on said pivot to disengage the worm 560 from the worm wheel 562. A crank 634 is preferably employed for this purpose, its motion being communicated to the sleeve 630 through an eccentric 638 and rod 640.

The type wheel cage 216, (Figs. 10, 11, and 12), which carries the type wheels 78 and gear wheels 85 and 86, together with the index wheel 562 and its gears, is supported from the main frame by means of cross rods 644 and 646 and ear plates 648, (Fig. 3) in which the trunnions 217 are mounted. These trunnions support the type wheel cage and also the elbow cranks 215 and 220, which are both shown in cross section in Fig. 12. The sides of the cage 216 are connected by cross pins 652.

It is sometimes desirable to add without printing. In such cases, it is merely necessary to insert a cross pin 654 through apertures in the elbow cranks 210 and 212, which apertures normally register with each other. When this pin is inserted, the bell cranks are locked and cannot drop into the cam recesses.

Briefly reviewing the operation of the machine, it will be understood that for normal key printing, the master key 352 will occupy the inner position in master cam 342. In use, the operator depresses value setting keys 1 representing the number to be added, and this inserts the proper selector pins 10 and determines the degree of movement of the front ends of the corresponding differential levers 14, the end pins of which are withdrawn by means of the chains 20. The keys having been depressed and locked by the key latches, the operator then pulls main differential lever 113, which, at the beginning of its movement, locks all the keys by means of cam 298, which passes under arm 296 and therefore prevents any oscillation of arm 58, whereas a slight oscillation is necessary to permit projection 54 of any key to pass a key latch bar in either direction. Lever 113 is prevented from returning by the dogs 122 and segment 120. Its continued movement winds up the main power spring or motor 114 a one sixth turn through ratchet member 126 and also unlocks the operating cams by lifting pawl 158 for a sufficient interval to allow the cams to revolve one turn and also restore the pawl to locking position. The main actuator cam 184 then actuates the differential levers 14, the auxiliary actuator cam 192 imparts the additional movement in the type wheel necessary to compensate for the two blank spaces, cam 244 moves the lifted racks into engagement with the accumulator pinions at the completion of the up stroke and maintains them there during the return stroke, after which cam 244 oscillates transferring wheels 246 and cam 260 shifts laterally to normal position any transferring wheels which have performed a transferring operation. In the meantime, the cam 586 oscillates the platen to printing position and printing cams on shaft 202 have locked and actuated the type wheels for the printing stroke, and cam 342 then releases the key latches and permits the keys 1 to return to normal position as the operating cams complete their revolution.

When printing totals, the master key 352 is shifted by depression of key 474 to the second position in the master cam, and with all value setting keys at normal, main actuator lever 113 is pulled, whereupon the cams again rotate in the same manner except that all variable cams on shaft 200 are shifted by master key and master cam as above described, and cam 342 actuates the key jack to select and depress keys corresponding with the accumulated values, after which these values are transmitted to the type wheels the same as in normal key printing, but in italics due to depression of key 474, which not only sets the master key, but also oscillates eccentrics 92 which support the bell crank modifiers. The transferring operations are omitted, and the accumulators restored to normal position during this movement. When printing subtotals, key 476 is depressed, thus again shifting the master cam and those it controls on shaft 200, but with the same effect except that the accumulators are not oscillated in either direction.

To print without adding, key 478 is depressed to shift the master key to its fourth or outer position. Value setting keys are then depressed as in normal key printing and the values printed in the same manner, but the racks 69 remain out of engagement with the accumulator pinions, during both the up and the down stroke, and therefore only printing operations are performed.

Where the same values are to be repeatedly added and printed, key 500 is depressed to disconnect bar 283 from member 285, and thus prevent the release of the key latches whereupon, with all other adjustments as for normal key printing, the lever 113 may be repeatedly actuated, without an intermediate depression of keys. The operation of the specializing keys when printing several columns, has already been fully explained, as is also the case with reference to the rotation of the counting wheel carrier to receive different sets of items.

The terms employed in this description and in the appended claims, are used as terms of description and not of limitation, as I do not intend by the terms used, to exclude mechanical equivalents for the parts shown and described, but realize that a large number of mechanical variations may be resorted to, without alteration in the general principles of construction and operation of the invention herein disclosed.

I desire to direct attention to the fact that all adjusting and locking movements of the accumulating and printing members are secured by direct transmission from the motor through mutually interacting and continuously interlocking members, there being no free movements, such as gravity strokes or spring reaction strokes at intermediate points. In fact, the entire machine is devoid of springs for the development of working strokes, except that I find it convenient to use a power storing spring for the motor and a reaction spring to impart the necessary free throw for printing, together with a set of springs for locking the depressed keys, another set of springs for raising the keys to normal position after they are released, and the springs, such as springs 534 and 582, which are used to impart a slight holding tension to locking or holding devices, thus preventing them from jarring out of position. All of the above mentioned springs, however, except the power storing spring and the printing springs 214 and 219, are used in connection with manually adjustable parts and operate only during the period of manual control and preparatory to the automatic action of the motor or main spring. It is therefore obvious that the failure of any of the springs to act properly must necessarily be immediately detected, for the reason that the operation of the printing springs is manifest upon the printed record. The operation of the main spring or motor is manifest in the fact that if the machine performs its automatic operations at all, the motor must be operative and it can only operate for the performance of the desired functions, while the operation of those springs which affect the manual adjustments of the keys and setting devices is necessarily observed in connection with the mentally directed acts of the operator in setting these parts in their proper position before operating the main lever to start the motor. Even in the manually adjusted operations, the possibility of error through carelessness on the part of the operator, or the failure of the springs used in connection with these parts to act properly, is practically eliminated, by the use of locking mechanisms above described, which prevent the operation of the machine until all manually adjustable parts are in proper position for the automatic operation.

In various parts of the mechanism shown in the drawings and described above, I have indicated multiple track cams, the various cam tracks of which are adapted to be thrown or shifted into operation through means of a controlling master cam, and I believe that I am the first person to employ a construction of this kind for the purpose indicated. Because of the use of a construction of this character, I am enabled to obtain a positive movement of the various parts, and to reduce materially the number of parts which it is necessary to employ in the machine.

Another feature of novelty and improvement is the use of different styles of type on the printing wheels to distinguish the various items from the totals, and another peculiarity of these type wheels is that each has a blank space normally in printing position, and because of this form of printing wheels, I am enabled to obtain clear and clean cut impressions from the type without any partial impressions occurring in those spaces which should remain blank. It will, of course, be understood that because of the use of those blank spaces, it is necessary to provide some means to compensate therefor, that is, to give an additional or supplemental movement to each printing wheel other than that brought about by the manipulation of a value key. This, however, has been fully taken care of in the mechanism shown and described. Those skilled in this art will readily appreciate the fact that it is necessary and desirable to cut in zeros to the right of the printed figures, and this is automatically accomplished in the embodiment of the invention described above. It should be noted also that a valuable characteristic of the adding or computing machine herein set forth resides in the proper movement or travel of the support on which are mounted the multiple accumulators, such movement being brought about automatically by the travel of the carriage, thereby permitting the accumulation of different classes of items on different accumulators.

It has been suggested heretofore to provide a machine having means for dividing the series of groups of value keys into a plurality of banks of such groups so that different classes of items may be set up in the different banks and properly printed on the paper without requiring the movement of the support carrying the multiple accumulators by means of the shifting of the carriage, and in the adding machine which I have described herein, improved and novel means are provided for accomplishing this result. A distinct improvement in machines of this class resides in the use of the differential levers employed in connection and co-operation with the groups of value keys, and by employing such levers, I am enabled in this particular embodiment of the invention to readily carry out the positive actuation of the accumulators and printing devices referred to above. A peculiar feature of this particular machine resides in the fact that the totals and sub-totals are set up on the printing wheels by means of substantially automatic manipulation of the value keys which are manually shifted for setting up the individual items. These, with other features of novelty and improvement, constitute some but not all of the valuable characteristics of this invention.

Having thus described my invention, what I claim as new, and desire to secure by Letters Patent, is—

1. A computing machine including the combination with accumulating and printing members, of a set of rotary cams provided with eccentric grooves, a set of oscillatory members loosely interlocked in said grooves, a power storing motor, connected to drive said cams in synchronism connections driven by said motor for automatically locking the motor upon completion of a single revolution of said cams, locking devices for the accumulating members actuated from said cams for both locking and unlocking operations and transferring members, for communicating movements from one accumulating wheel to the next, also actuated from said cams, some of said cams being connected to actuate the accumulator members and some of them also controlling the printing operations of the printing members.

2. In a computing machine, the combination with accumulating and printing members and manually actuated value setting keys, of a differential lever, a set of movable fulcrum members controlled as to position by the keys, means for actuating said differential lever over one of the fulcrum members, and motion transmitting connections between said levers and the accumulating and printing members.

3. A computing machine, including the combination with accumulating and printing members, of a power storing motor, a differential member, and a set of continuously interlocked motion transmitting connections controlled as to operation in part by the differential member and in part by the motor, and adapted to utilize the power of the motor to actuate the accumulating members in both individual and transferring movements and to also adjust the printing members in correspondence with the added values.

4. A computing machine including the combination with accumulating and printing members and keys for setting values, of a power storing motor, motor locking devices, a power storing lever for unlocking the motor, continuously engaged motion transmitting connections for actuating the accumulating and printing members in accordance with the set values, said connections including means for transferring values from one accumulating member to the next, and also including means for mechanically moving the motor locking devices to relocking position after the completion of the other movements.

5. A computing machine including accumulating transferring and printing members, and a power storing motor, the combination of a set of manually actuated value setting keys, of means for manually unlocking the motor, and a motor actuated shaft, provided with a series of members provided with connections adapted to actuate the accumulating and transferring members and control the operation of the printing members, and means whereby the character of the transmitting movements are determined by the set keys; said motor being provided with automatic relocking gears adapted to positively stop the motor after a predetermined cycle of movements which, with said motion transmitting connections are wholly independent of manual control.

6. In a computing machine, the combination with accumulating and printing members and manually actuated value setting keys, manually actuated, power storing and unlocking mechanisms, and means released by the unlocking mechanism for transmitting the power of the motor to adjust the accumulating and printing members in accordance with the values of the set keys, independently of manual control and independently of gravity movements and spring reactions at intermediate points after the unlocking operation is performed, said uncontrollable actuating means comprising a series of power actuated cams and motion transmitting connections between said cams and the accumulating and printing members arranged to be actuated in two directions by said cams for the production of both active and retractive strokes.

7. In a computing machine, the combination with accumulating and printing members and manually actuated value setting keys, manually actuated, power storing and unlocking mechanisms, and means released by the unlocking mechanism for transmitting the power of the motor to adjust the accumulating and printing members in accordance with the values of the set keys, independently of manual control and independently of gravity movements and spring reactions at intermediate points after the unlocking operation is performed, said uncontrollable actuating means comprising a series of power actuated cams and motion transmitting connections between said cams and the accumulating and printing members arranged to be actuated in two directions by said cams for the production of both active and retractive strokes, together with locking and unlocking devices for said accumulating members, and unlocking devices for said motion transmitting connections also actuated through some of said cams.

8. In a computing machine, the means for setting values, comprising a differential lever, selective fulcrum devices for said levers and keys, each having sliding contact with one of the fulcrum devices, and arranged, when moved in one direction, to push said device into supporting relation to said lever.

9. In a computing machine, the means for setting values, comprising a differential lever, selective fulcrum devices for said levers, and keys, each having sliding engagement with one of the fulcrum devices at an angle to the line of movement of said device, and arranged to move such device into and out of supporting relation to said lever on the active and retractive strokes, respectively, of the key.

10. In a computing machine, the means for setting values, comprising the combination with a suitable support, of a differential lever, selective fulcrum members mounted to slide in said support transversely of said lever, and into and out of fulcrum bearing relation thereto, and a set of keys, each arranged to actuate one of said members.

11. In a computing machine, the means for setting values, comprising the combination with a suitable support, of a differential lever, selective fulcrum members mounted to slide in said support transversely of said lever, and into and out of fulcrum bearing relation thereto, and a set of keys, each arranged to actuate one of said members, together with a normal fulcrum bearing member, and means, common to all the keys, for withdrawing such member from operative position, whenever a key is actuated to move a selective member into operative position.

12. In a computing machine, the means for setting values, comprising the combination with a suitable support, of a differential lever, selective fulcrum members mounted to slide in said support transversely of said lever, and into and out of fulcrum bearing relation thereto, and a set of keys, each arranged to actuate one of said members, together with a normal fulcrum bearing member, a swinging actuating member therefor, a chain loosely engaged with each of said keys and with said actuating member, supports for said chain intermediate of the keys, said keys being adapted to transmit movement through said chain to actuate the normal fulcrum bearing member, whereby the movement of any key may be utilized to move said member out of, or into operative relation to said lever.

13. In a machine of the described class, the combination of a set of differential levers, a series of movable fulcrum pins for each lever, a series of keys each having sliding engagement with one of the fulcrum pins, and arranged to shift into and out of supporting relation to said lever.

14. In a machine of the described class, the combination of a set of differential levers, means for shifting the fulcrum point of each of said levers, and a series of keys controlling said shifting means.

15. In a computing machine, the combination with value setting keys and accumulating and printing members, adjustable in accordance with the set values, of a power storing motor, a set of differential members actuated from the motor and controlled, as to degree of movement, from the set keys, means for transmitting movement from said differential members, to the accumulating and printing members, a master key, connections for varying the character of the transmitted movements in accordance with the position of the master key, means for transmitting motion from the motor to shift the master key, and manually operated devices, adjustable preparatory to the action of the motor, to regulate the key shifting movements.

16. In a computing machine, the combination with value setting keys and accumulating and printing members, adjustable in accordance with the set values, of a power storing motor, a set of differential members actuated from the motor and controlled, as to degree of movement, from the set keys, means for transmitting movement from said differential members, to the accumulating and printing members, a master key, connections for varying the character of the transmitted movements in accordance with the position of the master key, means for transmitting motion from the motor to shift the master key, and manually operated devices, adjustable preparatory to the action of the motor, to regulate the key shifting movements, together with means for locking the manually operated devices during the period of motion transmission from the motor.

17. In a computing machine, the combination with manually adjustable value setting keys, and accumulating and printing members adjustable in accordance with the set values, of a power storing motor, a locking device therefor actuated directly from the motor, connections for transmitting motion from the motor to adjust the accumulating and printing members in correspondence with the set key values, manually operated means for releasing the motor, devices connected with said means, for locking the value setting keys, and connections driven by said motor, for releasing said keys after adjusting the accumulating and printing members and preparatory to the motor locking operation.

18. In a computing machine, the combination with a series of sets of value setting keys, a set of accumulators and a set of type wheels controlled by the keys and rotated by a power storing spring motor, of spring winding mechanism motor actuated power transmitting connections directly connecting the motor with the accumulators and type wheels, devices connected with the spring winding mechanism for unlocking and locking said connections, and including a rotary member, and a fastening operatively connected with the spring winding mechanism and actuated therefrom to disengage from and reëngage with the rotary member once for each revolution of such member.

19. In a computing machine, the combination with manually adjustable value setting keys, and accumulating members adjustable in accordance with the set values, of a power storing motor for adjusting said members, a manually releasable lock therefor, and connections for transmitting motion from the motor to actuate the lock after a predetermined movement of the motor.

20. In a computing machine, the combination with value setting keys, and adjustable accumulating and printing members, of a power storing motor, a series of oscillatory members, connections for actuating said members from the motor in uniform oscillatory strokes, differential members each operatively connected with one of said oscillatory members, means controlled by the keys for selectively pivoting the differential members at different distances from the oscillatory members, and means for transmitting motion from the differential members to the accumulating and printing members.

21. In a computing machine, the combination with value setting keys, and adjustable accumulating and printing members, of a power storing motor, a series of oscillatory members, connections for actuating said members from the motor in uniform oscillatory strokes, differential members each operatively connected with one of said oscillatory members, means controlled by the keys for selectively pivoting the differential members at different distances from the oscillatory members, and means for transmitting motion from the differential members to the accumulating and printing members, together with a master key, means for actuating the same from the motor, manual means for predetermining the action of the motor upon the key, and connections, controlled by the key for varying the action of the motion transmitting means for adjusting the accumulating and printing members.

22. In a computing machine, the combination with a series of value setting keys, accumulating and printing members and devices for actuating such members in accordance with the values represented by the set keys, of a power storing spring motor lever actuated mechanism for storing power in the motor, driving connections for transmitting power from the motor to the actuating devices for the accumulating and printing members, a rotary cam and cam actuated member for unlocking and locking said driving connections, means, actuated by the power storing mechanism for rotating said cam to unlocking position, and means actuated by said driving connections for continuing the rotation of said cam to locking position.

23. In a computing machine, the combination with a series of value setting keys, accumulating and printing members and devices for actuating such members in accordance with the values represented by said keys, a power storing motor provided with a driving shaft, and lever actuated spring winding mechanism, of a driven shaft parallel therewith and having gear connection with the driving shaft, a notched member fast on the driven shaft, a locking dog adapted to engage said notched member and lock the driven shaft against rotation, a cam loose on the driven shaft and arranged when rotated to move said locking dog out of and into locking position, loose gears on said shafts, and a coöperative gear wheel fast on the driven shaft, to transmit motion from said shaft to said cam, and devices operatively connected with the spring winding mechanism for initially actuating said loose gears sufficiently to move the cam to a dog unlocking position.

24. In a computing machine, the combination with a series of value setting keys, accumulating and printing members and devices for actuating such members in accordance with the values represented by said keys, the combination of a power transmitting mechanism, a controlling lock therefor, a rotary lock operating member actuated thereby and free to move independently to release the lock, a motor, motor controlling mechanism, and connections adapted to transmit motion from the motor controlling mechanism to impart an independent lock releasing movement to the lock operating member.

25. In a computing machine, the combination with value setting keys, and adjustable accumulating and printing members, of a motor, connections actuated by the motor for adjusting the accumulating and printing members in accordance with the values represented by the set keys, variably acting connections, actuated by the motor, for adjusting keys in correspondence with the values registered by the accumulating members, and additional variable connections actuated by the motor, for effecting readjustments of the accumulating members, together with manually actuated devices controlling the variable operation of said connections, and motor actuated devices, for varying the operation of said connections in accordance with the adjustments of the manually actuated devices.

26. In a computing machine, the combination of a ratchet member having a plurality of arms, a relatively fixed support, a reciprocating member, and ratchet actuating and holding pawls, mounted upon the reciprocating member and fixed support respectively, each of said pawls being adapted to revolve over the end of an arm of the ratchet member during a relative movement of the latter, and means, connected with the ratchet member, for so rotating said pawls, together with a motor directly controlled by said ratchet member, power distributing devices actuated by said motor, and a lock adapted to release and lock the power distributing devices, controlled as to such release directly from the ratchet member, and also controlled as to holding, from the distributing devices.

27. In a machine of the described class, the combination with accumulating members, a motor for actuating the same, and manually adjusted means for predetermined control of the motor operations, of a series of cam members provided with eccentric ways, a series of oscillatory members each adapted to enter a plurality of such eccentric ways, and shifting means for changing the relative positions of the cam members and oscillatory members to engage the latter in different eccentric ways, said cam members being adapted to vary the operation of said motor upon the accumulating members.

28. In a machine of the described class, the combination with accumulating members, a motor for actuating the same, and manually adjusted means for predetermined control of the motor operations, of a series of cam members provided with eccentric ways in their side faces, located in different vertical planes, a series of oscillatory members each adapted to enter a plurality of ways in said cam members, lateral shifting means adapted to change the relative position of the oscillatory members and the cam members, whereby the former will be disengaged from one of said ways and engaged in another, said cam members being adapted to vary the operation of said motor upon the accumulating members.

29. In a machine of the described class, the combination of a series of cam members provided with eccentric ways in their side faces, located in different vertical planes, a series of oscillatory members each adapted to enter a plurality of ways in said cam members, lateral shifting means adapted to change the relative position of the oscillatory members and the cam members, whereby the former will be disengaged from one of said ways and engaged in another, together with computing mechanism controlled as to operation by said oscillatory members.

30. In a machine of the described class, the combination with accumulating members, a motor for actuating the same, and manually adjusted means for predetermined control of the motor operations, of a rotary member recessed in one of its faces to provide eccentric ways of substantially the same width at different distances from the surfaces, a device having a member conforming substantially to the width of each of the ways and adapted in one position to enter each of such ways, said device and said rotary member being relatively shiftable when in such position to determine the way in which such device engages, said rotary member being adapted to vary the operation of the motion transmitting mechanism for actuating the accumulating members from said motor.

31. In a machine of the described class, the combination of a rotary member recessed in one of its faces to provide eccentric ways of substantially the same width at different distances from the surfaces, a device having a member conforming substantially to the width of each of the ways and adapted in one position to enter each of such ways, said device and said rotary member being relatively shiftable when in such position to determine the way in which such device engages, together with computing mechanism controlled as to operation by said device.

32. In a machine of the described class, the combination with accumulating members, a motor for actuating the same, and manually adjusted means for predetermined control of the motor operations, of a support, a series of rotary members longitudinally movable along said support and provided with grooves in their opposing side faces, and a series of oscillatory members extending between the shifting members and adapted to engage in such grooves at either side, some of said grooves being eccentric and others annular in form, said accumulating members being partially controlled thereby.

33. In a machine of the described class, the combination with accumulating members, a motor for actuating the same, and manually adjusted means for predetermined control of the motor operations, of a support, a series of rotary members longitudinally movable along said support and provided with grooves in their opposing side faces, and a series of oscillatory members extending between the shifting members and adapted to engage in such grooves at either side, some of said grooves being eccentric and others annular in form, together with a rotary actuating member connected with said grooved members, and provided with ways at different depths from its periphery, all coinciding at a common entering point, and a radially adjustable key adapted to enter any one of said ways at the common entering point, said ways being relatively eccentric laterally with reference to each other and said key having a member adapted to substantially fit any one of the ways, said accumulating members being partially controlled thereby.

34. In a machine of the described class, a master cam controlling the variations in operation of the machine and provided with key ways at different depths from the periphery, a radially adjustable master key provided with a member adapted to substantially fit any one of said key ways, said key ways being laterally eccentric with reference to each other and said cam being laterally shiftable to correspond with the eccentric turns in the ways, together with accumulating members having actuating devices controlled in part by the relative positions of said key and cam.

35. In a machine of the described class, a master cam controlling the variations in operation of the machine and provided with key ways at different depths from the periphery, a radially adjustable master key provided with a member adapted to substantially fit any one of said key ways, said key ways being laterally eccentric with reference to each other and said cam being laterally shiftable to correspond with the eccentric turns in the ways, together with a set of motion transmitting connections governed as to the character of the transmitted motion, by said master cam, together with accumulating members having actuating devices controlled in part by the relative positions of said key and cam.

36. In a computing machine, the combination of a set of accumulating members, a movable transferring member adjustable for the transferring operation by one of the accumulating members into a position for transferring motion to the adjacent accumulating member, and cam actuated means for imparting such motion to the transferring member, said transferring member comprising a single disk shaped member continuously interacting in a set of grooves in the accumulating member, and provided with a projection to engage and actuate the adjacent accumulating member, when in one of the grooves, and the other groove being formed to shift the cam actuated member into the transferring groove once during each rotation of the first mentioned accumulating member.

37. In a computing machine, the combination with a set of adjustable accumulators, of an oscillatory transferring member mounted upon a suitable support adjacent to the accumulators and shiftable longitudinally along said support, means, carried by one of the accumulators for shifting said member along its support during the final movement of the accumulator to one position of adjustment, an actuating device carried by said member in a position, when such member is shifted by the accumulator, to actuate the adjacent accumulator during an oscillatory movement of said member, and means for oscillating said member after each adjustment of the accumulator.

38. In a computing machine, the combination of a set of adjustable accumulators, each provided with a plurality of channels and having an angular channel connecting the others, laterally shiftable transferring members, each normally engaged in a channel in one accumulator, and movable along said angular channel to the other channel, a device, carried by said transferring member in a position to engage and actuate the next accumulator, when the transferring member is so shifted from normal position, and means for moving the transferring members in a direction to actuate the next accumulators when shifted, and means for restoring the transferring members to normal position after each such actuating movement.

39. In a computing machine, the combination of a set of rotary accumulators provided with a plurality of peripheral channels connected by an angular channel, laterally movable transferring members, each having a segmental flange normally engaged in a peripheral channel in one of the accumulators, and adapted, as the accumulator completes its rotation, to be guided by the walls of the angular channel to engage in the other peripheral channel, means for oscillating the transferring members, a device carried by each transferring member for engaging and actuating the next accumulator wheel during such oscillation, and means for restoring said transferring members to normal position.

40. In a computing machine, the combination with a set of rotary accumulators provided with a plurality of peripheral channels connected by an angular channel, laterally movable transferring members, each having a segmental flange normally engaged in a peripheral channel in one of the accumulators, and adapted, as the accumulator completes its rotation, to be guided by the walls of the angular channel to engage in the other peripheral channel, means for oscillating the transferring members, a device carried by each transferring member for engaging and actuating the next accumulator wheel during such oscillation, and means for restoring said transferring members to normal position, said actuating devices on successive transferring members, being relatively positioned for successive operation upon their respective accumulator wheels.

41. In a computing machine, an accumulating mechanism comprising the combination with a shaft, a set of accumulating wheels each independently rotatable on said shaft, and key controlled means for separately actuating said wheels, of another shaft, a set of transferring members separately movable along the shaft, and having a common rotative movement therewith, interacting devices carried by each accumulator wheel and a corresponding transferring member, adapted to shift the transferring member along its supporting shaft once during each revolution of the accumulating wheel, a device carried by the transferring member, adapted, when such member is shifted, to move into a position for actuating the next succeeding accumulator wheel, and means for imparting a rotative movement to the supporting shaft to swing the actuating devices of all shifted members into motion transmitting engagement with such succeeding accumulator wheels.

42. In a computing machine, the combination of a shaft provided with a series of independently rotatable accumulators, another shaft provided with a series of transferring members, each independently shiftable along such shaft, and all rotative therewith in common, each accumulator having interacting shifting connection with one of the transferring members, adapted to move the latter along its shaft once during the rotation of the accumulator, and each transferring member being provided with a device for actuating a succeeding accumulator during a rotative movement thereof when shifted out of normal position.

43. In a computing machine, the combination of a shaft provided with a series of independently rotatable accumulators, another shaft provided with a series of transferring members, each independently shiftable along such shaft, and all rotative therewith in common, each accumulator having interacting shifting connection with one of the transferring members, adapted to move the latter along its shaft once during the rotation of the accumulator, and each transferring member being provided with a device for actuating a succeeding accumulator during a rotative movement thereof when shifted out of normal position, together with key controlled mechanism for independently actuating the accumulators, and a motor actuated cam for imparting rotative movements to the transferring member shaft, and members.

44. In a computing machine, the combination of a shaft provided with a series of independently rotatable accumulators, another shaft provided with a series of transferring members, each independently shiftable along such shaft, and all rotative therewith in common, each accumulator having interacting shifting connection with one of the transferring members, adapted to move the latter along its shaft once during the rotation of the accumulator, and each transferring member being provided with a device for actuating a succeeding accumulator during a rotative movement thereof when shifted out of normal position, together with key controlled mechanism for independently actuating the accumulators, and a motor actuated cam for imparting rotative movements to the transferring member shaft, and members, and another cam, actuated from said motor to shift the transferring members back to normal position.

45. In a computing machine, the combination of a shaft provided with a series of independently rotatable accumulators, another shaft provided with a series of transferring members, each independently shiftable along such shaft, and all rotative therewith in common, each accumulator having interacting shifting connection with one of the transferring members, adapted to move the latter along its shaft once during the rotation of the accumulator, and each transferring member being provided with a device for actuating a succeeding accumulator during a rotative movement thereof when shifted out of normal position, the accumulator actuating devices on succeeding transferring wheels being differently positioned in the arc of rotation and arranged to act upon the respective accumulators in sequence.

46. In a computing machine, the combination of a shaft provided with a series of independently rotatable accumulators, another shaft provided with a series of transferring members, each independently shiftable along such shaft, and all rotative therewith in common, each accumulator having interacting shifting connection with one of the transferring members, adapted to move the latter along its shaft once during the rotation of the accumulator, and each transferring member being provided with a device for actuating a succeeding accumulator during a rotative movement thereof when shifted out of normal position, together with key controlled mechanism for independently actuating the accumulators, and a motor actuated cam for imparting rotative movements to the transferring member shaft, and members in the intervals between the key controlled movements.

47. In a computing machine, the combination of a shaft provided with a series of independently rotatable accumulators, another shaft provided with a series of transferring members, each independently shiftable along such shaft, and all rotative therewith in common, each accumulator having interacting shifting connection with one of the transferring members, adapted to move the latter along its shaft once during the rotation of the accumulator, and each transferring member being provided with a device for actuating a succeeding accumulator during a rotative movement thereof when shifted out of normal position, together with key controlled mechanism for independently actuating the accumulators, and a motor actuated cam for imparting rotative movements to the transferring member shaft, and members in the intervals between the key controlled movements, and said key controlled mechanism being locked during the interval of cam actuated movements.

48. In a computing machine, the combination of a shaft provided with a series of independently rotatable accumulators, another shaft provided with a series of transferring members, each independently shiftable along such shaft, and all rotative therewith in common, each accumulator having interacting shifting connection with one of the transferring members, adapted to move the latter along its shaft once during the rotation of the accumulator, and each transferring member being provided with a device for actuating a succeeding accumulator during a rotative movement thereof when shifted out of normal position, together with key controlled mechanism for independently actuating the accumulators, and a motor actuated cam for imparting rotative movements to the transferring member shaft, and members, together with a carrier supporting said accumulator and transferring members, a series of sets of such members mounted on said carrier, and means for moving the carrier to adjust any one of sets into or out of operative relation to the key and cam controlled actuating mechanisms.

49. In a computing machine, the combination of a shaft provided with a series of independently rotatable accumulators, another shaft provided with a series of transferring members, each independently shiftable along such shaft, and all rotative therewith in common, each accumulator having interacting shifting connection with one of the transferring members, adapted to move the latter along its shaft once during the rotation of the accumulator, and each transferring member being provided with a device for actuating a succeeding accumulator during a rotative movement thereof when shifted out of normal position, and locking devices for the accumulator wheels, each controlled by a transferring member.

50. In a computing machine, the combination of a shaft provided with a series of independently rotatable accumulators, another shaft provided with a series of transferring members, each independently shiftable along such shaft, and all rotative therewith in common, each accumulator having interacting shifting connection with one of the transferring members, adapted to move the latter along its shaft once during the rotation of the accumulator, and each transferring member being provided with a device for actuating a succeeding accumulator during a rotative movement thereof when shifted out of normal position, together with a locking pawl for each accumulator, said transferring members being each provided with an eccentric groove, and said pawls each having an arm engaged in the groove of the interacting transferring wheel and held thereby in locking position at all times except when the accumulator is being actuated.

51. In a computing machine, the combination with a rotary accumulator provided with a pinion, key controlled actuating mechanism for transmitting motion to said pinion, a locking pawl for said accumulator, an oscillatory member for transferring values to another accumulator provided with a plurality of ways selectively engaging said locking pawl, one of said ways being provided with offset walls adapted to move said pawl to unlocking position during the intervals of accumulator movement, and the other of said ways having walls arranged to hold said pawl in locking position during the return movement of the oscillatory member, means controlled by the accumulator, for shifting said member to engage the pawl in one of the ways, and cam actuated means for shifting said member to engage the pawl in the other of said ways.

52. In a computing machine, the combination with a rotary accumulator and a locking member therefor, of an oscillatory transferring member having a plurality of ways with walls adapted to guide the locking member into and out of locking position, means for actuating the transferring member to shift the pawl engagement from one of said ways to the other, and means for imparting a rotative movement to said transferring member to actuate the locking member and effect the transferring operation.

53. In a computing machine, the combination with a rotary accumulator and a locking member therefor, of an oscillatory transferring member having a plurality of ways with walls adapted to guide the locking member into and out of locking position, means for actuating the transferring member to shift the pawl engagement from one of said ways to the other, and means for imparting rotative movements in opposite directions to the transferring member, its movement in one direction being arranged to move the pawl to unlocking position when in either of said ways, and its movement in the other direction being adapted to momentarily unlock the pawl when in one of the ways and to keep it locked when in the other of said ways.

54. In a computing machine, the combination of a set of accumulators and their actuating connections, a set of type wheels and actuating connections, each including a motion transmitting lever operatively connected with one of the accumulator actuating connections, and means for varying the fulcrum point of said lever.

55. In a computing machine, the combination of a set of accumulators and their actuating connections, a set of type wheels and actuating connections, each including a motion transmitting lever operatively connected with one of the accumulator actuating connections, and means for varying the fulcrum point of said lever together with means for varying the motion of the fulcrum varying means.

56. In a computing machine, the combination of a set of type wheels and actuating connections, a set of accumulators and actuating connections operatively arranged to also actuate the type wheel connections in accordance with the motion of the accumulators, and means for separately imparting a movement of uniform length to the type wheel connections.

57. In a computing machine, the combination of a set of type wheels and actuating connections, a set of accumulators and actuating connections operatively arranged to also actuate the type wheel connections in accordance with the motion of the accumulators, and means for separately imparting a movement of uniform length to the type wheel connections, and other separate means for modifying the length of said movement in the type wheel connections.

58. In a computing machine, the combination of a set of type wheels and actuating connections, a set of accumulators and actuating connections operatively arranged to also actuate the type wheel connections in accordance with the motion of the accumulators, a set of value setting keys controlling the degree of movement imparted by the actuating connections to the accumulators, and devices, operated by said actuating connections independently of motion derived from the keys, for separately imparting an additional movement of uniform length to all type wheel connections directly actuated by such connections and to all other type wheels at one side thereof.

59. In a computing machine, the combination of a set of type wheels and actuating connections, a set of accumulators and actuating connections, and a set of connections for transmitting motion to the type wheels from the actuating connections of the accumulators, in proportion to the movements transmitted to the accumulators, an oscillatory shaft, motion varying members shiftably mounted on said shaft, and adapted to communicate additional movements of uniform length to the type wheels, said accumulator actuating connections being provided with shifting connections for said members, adapted to move them into and out of motion varying position.

60. In a computing machine, the combination with a series of sets of value setting keys, a set of type wheels, corresponding sets of accumulators, and differential actuating levers controlled as to length of stroke by said keys, lever actuating mechanism and connections for transmitting motion from said levers to the accumulators and type wheels, said type wheel actuating connections including a set of levers, one for each wheel, and a movable fulcrum support for each such lever.

61. In a computing machine, the combination with actuating mechanisms for operating accumulating and transferring members, of a carrier, a plurality of sets of accumulating and carrying members, each adapted to be moved by the carrier into and out of engagement with the actuating mechanisms, and coupling members, adapted to transmit motion from the actuating mechanisms to the engaged set of accumulating and transferring members.

62. In a computing machine, the combination with actuating mechanisms for operating accumulating and transferring members, of a carrier, a plurality of sets of accumulating and carrying members, each adapted to be moved by the carrier into and out of engagement with the actuating mechanisms, and coupling members, adapted to transmit motion from the actuating mechanisms to the engaged set of accumulating and transferring members, together with a platen supporting carriage, and detachable means for transmitting motion from said carriage to actuate the carrier.

63. In a computing machine, the combination with actuating mechanisms for operating accumulating and transferring members, of a carrier, a plurality of sets of accumulating and carrying members, each adapted to be moved by the carrier into and out of engagement with the actuating mechanisms, and coupling members, adapted to transmit motion from the actuating mechanisms to the engaged set of accumulating and transferring members, said coupling members being arranged to automatically connect and disconnect, as the respective sets of members move into and out of motion receiving position.

64. In a computing machine, the combination with actuating mechanisms for operating accumulating and transferring members, of a rotary carrier, a plurality of sets of such members mounted therein, a relatively stationary guide member provided with an annular channel arranged to receive the ends of the transferring member shafts, and an oscillatory coupling member for the actuating mechanism extending into said channel and provided with a corresponding channel through which the shaft ends are adapted to pass as the carrier rotates, said shaft ends having a flattened neck and the walls of the channel and coupling member being formed to fit said channel to prevent independent shaft rotation.

65. In a computing machine, the combination with actuating mechanisms for operating accumulating and transferring members, of a rotary carrier, a plurality of sets of such members mounted therein, a relatively stationary guide member provided with an annular channel arranged to receive the ends of the transferring member shafts, and an oscillatory coupling member for the actuating mechanism extending into said channel and provided with a corresponding channel through which the shaft ends are adapted to pass as the carrier rotates, said shaft ends having a flattened neck and the walls of the channel and coupling member being formed to fit said channel to prevent independent shaft rotation, together with an independently oscillatory bearing member encircling a portion of the coupling member and provided with a diagonal guide way and a relatively fixed pin loosely engaged in said slot, said bearing member also forming a part of the actuating mechanism, adapted to impart a longitudinal movement to the transferring member shafts.

66. In a computing machine, the combination of a pivotally supported type wheel cage, a set of type wheels mounted in said cage, at a distance from the pivotal axis, a set of motion transmitting gear wheels, one for each type wheel, mounted with their pitch circles cutting the pivotal axis of the cage, and means for imparting a printing stroke to the cage and a series of sets of keys controlling the rotative motion of said gear wheels.

67. In a computing machine, the combination of a pivotally supported type wheel cage, a set of type wheels mounted in said cage, at a distance from the pivotal axis, a set of motion transmitting gear wheels, one for each type wheel, mounted with their pitch circles cutting the pivotal axis of the cage, and means for imparting a printing stroke to the cage, together with means for locking all the type wheels preparatory to the printing stroke and a series of sets of keys controlling the rotative motion of said gear wheels.

68. In a computing machine, the combination of a pivotally supported type wheel cage, a set of type wheels mounted with their pitch circles cutting the cage, at a distance from the pivotal axis, a set of motion transmitting gear wheels, one for each type wheel, mounted upon the pivotal axis of the cage, and means for imparting a printing stroke to the cage, together with a buffer adapted to equalize the impact strains on the cage when types are exposed for printing on one side only and a series of sets of keys controlling the rotative motion of said gear wheels.

69. In a computing machine, the combination with type wheel actuating mechanism and motion controlling value setting keys, of a pivotally supported type wheel cage, a set of type wheels mounted in said cage at a distance from the pivotal axis, means for separately rotating the type wheels, and means for swinging the cage upon its pivotal axis to simultaneously impart a printing stroke to all the type wheels.

70. In a computing machine, the combination with type wheel actuating mechanism and motion controlling value setting keys, of a pivotally supported type wheel cage, a set of type wheels mounted in said cage at a distance from the pivotal axis, means for separately rotating the type wheels, and means for swinging the cage upon its pivotal axis to simultaneously impart a printing stroke to all the type wheels, said type wheels being each provided with peripheral blank spaces normally exposed in printing position.

71. In a computing machine, the combination with a set of value setting keys and accumulators, of a type wheel provided with pairs of printing type numerals of the same numerical value but differing characteristically and arranged with one kind of type in each pair preceding the other in serial order along the periphery of the wheel, and all of the type numerals being out of printing position when the wheel is in normal position, together with means controlled by said keys for rotating said wheel in accordance with the set values, and means, controlled by the operator, for additionally rotating said wheel to expose a numeral of the same value but of different character.

72. In a computing machine, the combination of a pivotally supported freely swinging type wheel cage, a set of type wheels mounted therein at a distance from the pivotal axis, an actuating lever having an arm in position to loosely engage the cage and a spring actuated trip for operating said lever to impart a printing stroke to the cage.

73. In a computing machine, the combination with a series of sets of actuating keys and accumulators, of a pivotally supported freely swinging type wheel cage, a set of type wheels mounted therein at a distance from the pivotal axis and controlled as to rotative motion from said keys, an actuating lever and a wheel locking lever having pivotal axes coinciding with that of the cage, one arm of the actuating lever being adapted to loosely engage the cage, and one arm of the locking lever being adapted to loosely engage the type wheels, and spring actuated trip mechanism for operating said levers, comprising a set of levers having cam supported arms connected by a retracting spring adapted to actuate each of said arms in the direction of the other with a quick positive stroke when its supporting cam is in a position to permit such movement.

74. In a computing machine, the combination with a plurality of sets of accumulating and transferring members, of a rotary carrier therefor, actuating mechanism adapted to transmit motion to the members of any set when the carrier is rotated to bring such set into registry with said mechanism, a holding member on the carrier provided with angularly sided recesses and a holding lever having a projection adapted to loosely engage in any one of the recesses, together with a main actuating lever controlling the actuating mechanism, and means, connected therewith, for locking said holding lever.

75. In a computing machine, the combination with a set of value setting keys and motion transmitting mechanism, controlled, as to character of movement, by the set keys, of a key locking mechanism comprising a set of independently movable notched key latches, an oscillatory key releasing shaft provided with arms, each loosely engaged at one end of the notch in one of the key latches, and free to oscillate to the other end of the notch without actuating the latch, catch projections upon said keys, each adapted to actuate one of the latches in moving to key setting position, a main actuating lever controlling the motion transmitting mechanism, and a device connected with said lever, for locking said shaft and key latches during the movement of said actuating lever.

76. In a computing machine, the combination of a plurality of movable accumulators, a plurality of transfer mechanisms each adapted to carry from one accumulator to the next, means operable by each accumulator for putting its transfer mechanism into carrying condition, an independent lock for each of said accumulators adapted to hold the same against movement, means to actuate said transfer mechanisms, and means to unlock those only of said accumulators whose transfer mechanisms have been put into carrying condition by the accumulators, substantially as described.

77. In a computing machine, the combination of a plurality of movable accumulators, a plurality of transfer mechanisms each adapted to carry from one accumulator to the next, means operable by each accumulator for putting its transfer mechanism into carrying condition, an independent lock for each of said accumulators adapted to hold the same against movement, means to actuate said transfer mechanisms, and means to unlock those only of said accumulators whose transferring mechanisms have been put into carrying condition, said unlocking occurring only during the performance of the carrying operations, substantially as described.

78. In a computing machine, the combination of a series of groups of value keys, a movable printer for and controlled by each of said groups, each of said printers having a blank space and a series of type numerals and normally positioned with its blank space in printing position, means to shift all of said printers of the groups of keys to the right of an actuated key to move the same, whereby to bring their 0 types to printing position, and means capable of preventing such shifting of a number of said printers from blank to 0, whereby said series of groups of keys may be divided into banks of groups the actuation of the keys of which does not interfere with the keys or printers of the bank or banks to the right, substantially as described.

79. In a computing machine, the combination of a series of groups of value keys, a movable printer for and controlled by each of said groups, each of said printers having a blank space and a series of type numerals and normally positioned with its blank space in printing position, means to shift all of said printers of the groups of keys to the right of an actuated key to move the same, whereby to bring their 0 types to printing position, said means also shifting the printer of the group of keys containing the actuated key to shift from one type numeral to the next one of higher value, and means capable of preventing such shifting of a number of said printers from blank to 0, whereby said series of groups of keys may be divided into banks of groups, the actuation of the keys of which does not interfere with the keys or printers of the bank or banks to the right, substantially as described.

80. In a computing machine, a number device, a printer, a set of value keys, and means to set up the value of an actuated key on said number device and printer and print such value, said means including a rotary cam, a motor, means for actuating said cam from the motor in step by step, one revolution movements, and an arm coöperating with said cam to control the movements of the number device and printer, substantially as described.

81. In a computing machine, the combination of a number device, a printer, a set of value keys, and means to set up the value of an actuated key on said number device and printer and print such value, said means including a cam track and an arm coöperating with said track, total means to set up the total of the number device on the printer, a second cam track, and means to shift said first cam track out of coöperative relation with said arm and said second track into coöperative relation therewith, whereby to render said total means operative and to secure printing of the total of the number device by said printer, substantially as described.

82. In a computing machine, the combination of an accumulator, a printer, a set of value keys, and means to set up the value of an actuated key on said accumulator and printer and print such value, said means including a cam track and an arm coöperating with said track, a second cam track, and means to shift said first track out of coöperative relation with said arm and shift said second track into coöperative relation with said arm, whereby to secure the printing of the value of the key without the addition of its value on the accumulator, substantially as described.

83. In a computing machine, the combination of an accumulator, a printer, operating means for said accumulator and printer including a plurality of cam tracks, and an arm adapted to co-act with any of the individual cam tracks, and means to shift said cam tracks and arm relatively to one another to effect different results, substantially as described.

84. In a computing machine, the combination of an accumulator, a printer, operating means for said accumulator and printer including a plurality of cam tracks and an arm adapted to coact with any of the individual cam tracks, and cam means to shift said cam tracks and arm relatively to one another to effect different results, substantially as described.

85. In a computing machine, the combination of a movable support, a plurality of number devices mounted on said support, means to operate one of said devices at a time when they are individually brought to a definite position by the movement of said support, a movable paper carriage, a set of printers, and a connection between said carriage and support to move the latter and its number devices upon shifting of the carriage, said number devices being arranged in different relations to the set of printers, whereby only one of them may be in operative relation to the printers at any given time, substantially as described.

86. In a computing machine, the combination of a movable support, a plurality of number devices mounted on said support, means to operate said devices one at a time as they are individually and separately brought into a definite position by movement of said support, a slidable paper carriage, releasable means to stop said carriage in predetermined positions, a set of printers, and a connection between said carriage and support to move the latter, whereby as the carriage stops in its various positions, determined by said releasable stop means, said number devices will be individually brought into operative relation with said operating means, permitting tabulation of the printed numbers in separate columns, substantially as described.

87. In a computing machine, the combination of a movable number device, means to actuate said number device, a lock to hold said device against movement, a lock controller having a plurality of cam tracks, and means to shift said controller and lock relatively to one another, whereby to render said cam tracks independently operative on said lock, substantially as described.

88. In a computing machine, the combination of a movable number device, a plurality of means to actuate said number device, a lock to hold said device against movement, a lock controller having a plurality of cam tracks, and means to shift said lock controller and lock relatively to one another to bring said cam tracks individually into operative relation with said lock, substantially as described.

89. In a computing machine, the combination of a pair of number devices, a movable transfer device adapted to be shifted by one of said number devices into operative relation with the other number device, a lock for said latter device, a double cam track coöperating with said lock and movable with said transferring device, means to move said transferring device to carry from the first to the second number device provided said transferring device has been shifted into carrying position, one of said cam tracks when the transferring device is in unshifted position acting during the movement of said device to maintain said second number device locked, the other cam track in the shifted position of said transferring device acting to unlock said second number device only during the actual movement thereof by the transferring device, substantially as described.

90. In a computing machine, the combination of a bar, a plurality of keys, a fulcrum associated with each of said keys, any one of said fulcrums being adapted to be shifted by its key into coöperative relation with said bar to convert the latter into a lever, and a chain coöperating with said keys and adapted to be flexed by an actuated key, said chain preventing the manipulation of more than one key at a time, substantially as described.

91. In a computing machine, the combination of a bar, a support for said bar, a plurality of keys, a fulcrum associated with each of said keys, any one of said fulcrums being adapted to be shifted into coöperative relation with said bar by its key to convert the bar into a lever, and a chain associated with said support and keys and adapted to withdraw said support from the bar upon manipulation of a key, the latter causing the flexure of the chain, said chain replacing said support when its flexure is removed by the return of the actuated key to original position, substantially as described.

92. In a computing machine, the combination of a set of printing members each having a series of type numerals thereon and a blank space, said blank spaces in the unoperated condition of the members being in printing position, means to shift said printing members individually an amount sufficient to bring into printing position numerals on said members one less in value than those desired to be printed, and means to advance all of said printing members including and to the right of the actuated printing member farthest to the left, whereby the desired numerals are brought to printing position on the actuated keys and zero types are shifted to printing position on the otherwise unactuated printing members to the right of the actuated printing member farthest to the left, substantially as described.

93. In a computing machine, the combination of an accumulator, means to actuate said accumulator, a movable value key adapted when shifted to control the movement of said accumulator, means including a movable cam and operating arm to control the operation of said actuating means on said accumulator, a second movable key, and means operable by said latter key and adapted to shift said cam and operating arm relatively to one another, whereby to cause a modified action of said actuating means on said accumulator, substantially as described.

94. In a machine of the character described, the combination of a movable accumulator, a set of shiftable keys of different values, a movable printing member having two different sets of numerical type, actuating means to operate said accumulator and printing member under the control of a shifted key of said set, whereby to add the value of said key on said accumulator and to print said value in one style of type, means under the control of said accumulator to shift the key of said set corresponding to the value indicated on said accumulator, means to modify the action of said actuating means, whereby during its operation after the key has been set under the control of the accumulator the value of the accumulator will be printed by said printing member in the other style of type, and means to operate said actuating means, substantially as described.

95. In a computing machine, the combination of a plurality of printing members each having type numerals thereon with a plurality of such numerals of the same numerical value but differing characteristically, whereby printed totals may be distinguished from the individual items composing such totals, and a total key adapted when actuated to shift said printing members to bring about the printing of totals in the proper type, substantially as described.

96. In a computing machine, the combination of an accumulator, a set of movable keys of different numerical values, a movable printing member having numerical types, means to move said printing member to bring said types into printing position, the actuation of any one of said keys determining the type to be brought to such position, and means controlled by said accumulator to actuate the key of the same numerical value as that indicated on said accumulator, whereby the amount registered on said accumulator may be printed by said printing member, substantially as described.

97. In a computing machine, the combination of an accumulator, a set of movable keys of different numerical values each capable of controlling the operation of said accumulator, a movable printing member having numerical types, means to move said printing member to bring said types into printing position, the actuation of any one of said keys determining the type to be brought to such position, and means controlled by said accumulator to actuate the key of the same numerical value as that indicated on the accumulator, whereby the amount registered on said accumulator may be printed by said printing member, said keys being rendered inoperative on the accumulator when the total is taken off therefrom on to the printing member, substantially as described.

98. In a computing machine, the combination of an accumulator, a set of movable keys of different numerical values, a movable printing member having numerical types, means to move said printing member to bring said types into printing position, the actuation of any one of said keys determining the type to be brought to such position, means controlled by said accumulator to actuate the key of the same numerical value as that indicated on the accumulator, whereby the amount registered on said accumulator may be printed by said printing member, the setting up of the amounts on said accumulator by the keys being a positive action, and means to return said accumulator to original position after the printing member has printed the total, substantially as described.

99. In a computing machine, the combination of an accumulator, a set of movable keys of different numerical values adapted to control the movement of the accumulator, a movable printing member having numerical types, means to move said printing member to bring said types into printing position, the actuation of any one of said keys determining the type to be brought to such position, means controlled by the accumulator to actuate the key of the same numerical value as that indicated on the accumulator, whereby the amount registered on the accumulator may be printed by said printing member, and means to positively move said accumulator an amount depending upon the particular key actuated, and to positively return said accumulator to original position when the total is printed, substantially as described.

100. In a machine of the character described, the combination of a movable number device, a shiftable key, a lock adapted to hold said number device against movement, a motor, actuating connections for said number device and lock, all the parts of said actuating connections being continuously interlocking and interacting during motion transmission, whereby such parts must necessarily move simultaneously, said key controlling the degree of movement of said number device derived from said actuating connections.

101. In a computing machine the combination with accumulating and printing members and manually actuated value setting keys, of a differential member, a set of movable fulcrum members controlled as to position by the keys, means for actuating said differential member over one of the fulcrum members, and motion transmitting connections between said differential member and the accumulating and printing members.

102. In a computing machine, the combination with accumulating and printing members and manually actuated value setting keys, of a differential member, a set of movable pivot members controlled as to position by the keys, means for actuating said differential member over one of the pivot members, and motion transmitting connections between said differential member and the accumulating and printing members.

103. In a machine of the class described, the combination with an actuating lever and means for moving one end thereof through a path of invariable extent, of a bank of keys, elements moved by said keys into positions to form fulcrums for said lever, and accounting mechanism controlled by said actuating lever.

104. In a machine of the class described, the combination with an accounting device, of means for driving the accounting device including a lever provided with holes located at different points along its length and manipulative devices controlling plungers for entering said holes and thereby regulating the extent of movement imparted to the accounting device.

In testimony whereof I affix my signature in the presence of two witnesses.

CHARLES P. WETMORE.

Witnesses:
LEVERETT C. WHEELER,
O. R. ERWIN.

Copies of this patent may be obtained for five cents each, by addressing the "Commissioner of Patents, Washington, D. C."